US008679678B2

(12) United States Patent
Fuhr et al.

(10) Patent No.: US 8,679,678 B2
(45) **Date of Patent: *Mar. 25, 2014**

(54) CURRENT COLLECTOR FOR AN ELECTROMECHANICAL CELL

(75) Inventors: Jason D. Fuhr, Sussex, WI (US); Gerald K. Bowen, Cedarburg, WI (US); John P. Dinkleman, South Milwaukee, WI (US); Thomas J. Dougherty, Waukesha, WI (US); Wataru Tsutsui, West Lafayette, IN (US); Chris Bonin, South Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,183

(22) Filed: Aug. 9, 2012

(65) Prior Publication Data

US 2012/0301756 A1 Nov. 29, 2012

Related U.S. Application Data

(63) Continuation of application No. 13/087,277, filed on Apr. 14, 2011, now Pat. No. 8,263,246, which is a continuation of application No. PCT/US2009/065365, filed on Nov. 20, 2009.

(60) Provisional application No. 61/116,993, filed on Nov. 21, 2008, provisional application No. 61/172,148, filed on Apr. 23, 2009.

(51) Int. Cl.
*H01M 4/64* (2006.01)
*H01M 2/12* (2006.01)

(52) U.S. Cl.
USPC ............ 429/211; 429/82

(58) Field of Classification Search
USPC ............ 429/82–84, 94, 211, 233, 241, 242; D13/119–121
See application file for complete search history.

(56) References Cited

U.S. PATENT DOCUMENTS

| | | | | |
|---|---|---|---|---|
| 5,853,912 | A | 12/1998 | Naing et al. | |
| 6,482,543 | B1 * | 11/2002 | Shelekhin et al. | 429/164 |
| 7,214,250 | B2 * | 5/2007 | Yashiro et al. | 29/623.4 |
| 2005/0048365 | A1 * | 3/2005 | Miyahisa et al. | 429/174 |
| 2006/0210880 | A1 | 9/2006 | Howard et al. | |
| 2006/0228620 | A1 | 10/2006 | Martinson et al. | |
| 2007/0009785 | A1 | 1/2007 | Kozuki et al. | |
| 2008/0026291 | A1 * | 1/2008 | Kim | 429/211 |
| 2008/0070098 | A1 | 3/2008 | Ray et al. | |
| 2008/0131769 | A1 | 6/2008 | Sato et al. | |

FOREIGN PATENT DOCUMENTS

EP 0 785 585 A1 7/1997

OTHER PUBLICATIONS

U.S. Appl. No. 13/571,144, filed Aug. 9, 2012, Matthew R. Tyler.

* cited by examiner

*Primary Examiner* — Carlos Barcena
*Assistant Examiner* — Michael Dignan
(74) *Attorney, Agent, or Firm* — Fletcher Yoder PC

(57) ABSTRACT

A current collector for an electrochemical cell includes a member having an outer member and an inner member coupled to the outer member by a plurality of flexible arms configured to allow the inner member to move relative to the outer member.

13 Claims, 15 Drawing Sheets

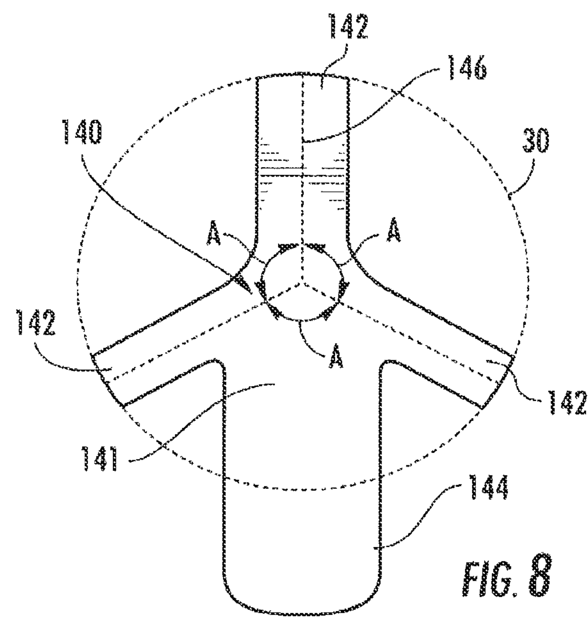
FIG. 8
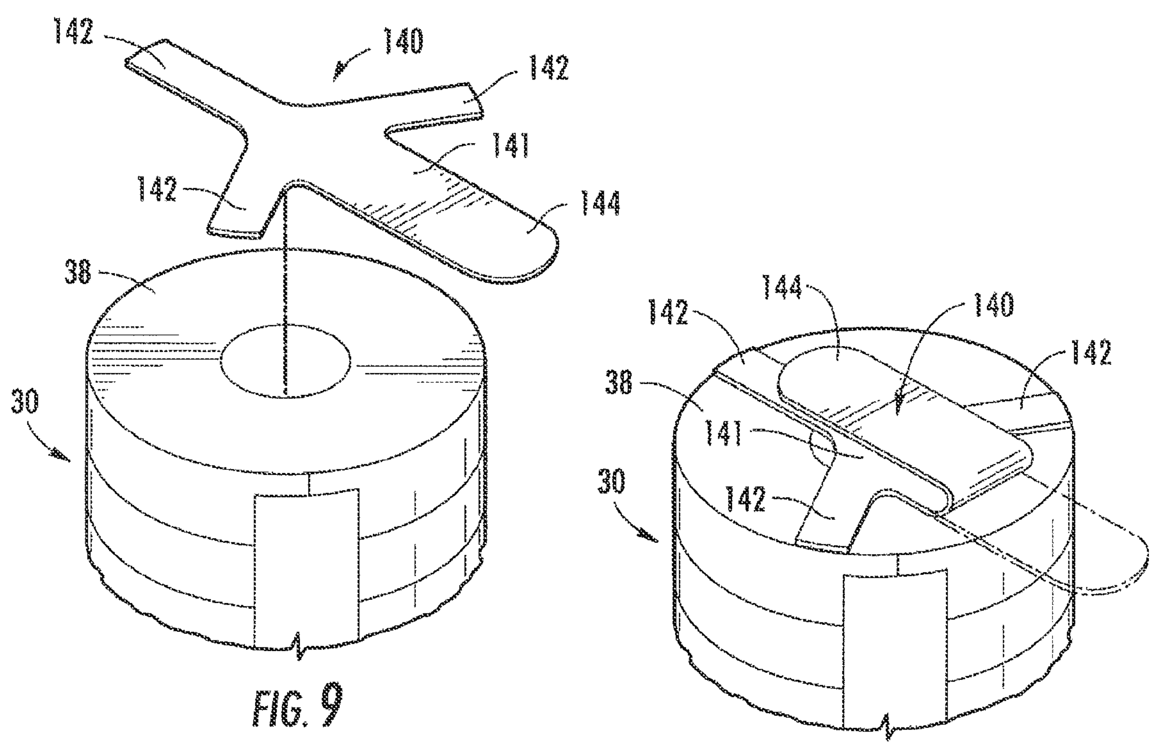
FIG. 9
FIG. 9A 244
240
B
242
241
34
34
30
38
32
36

244
240
244
242
241
30
38
32
36
34

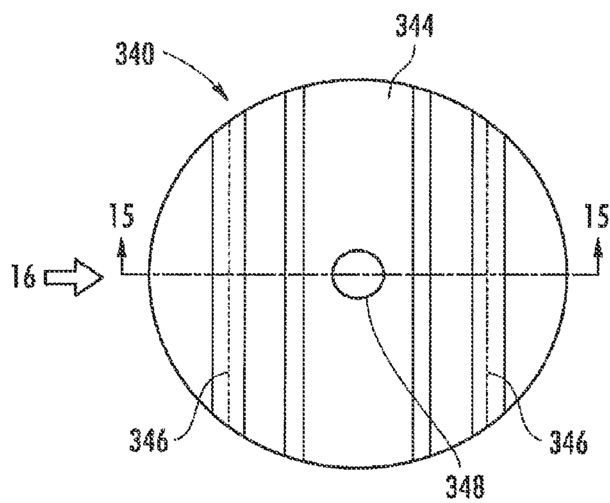
FIG. 14
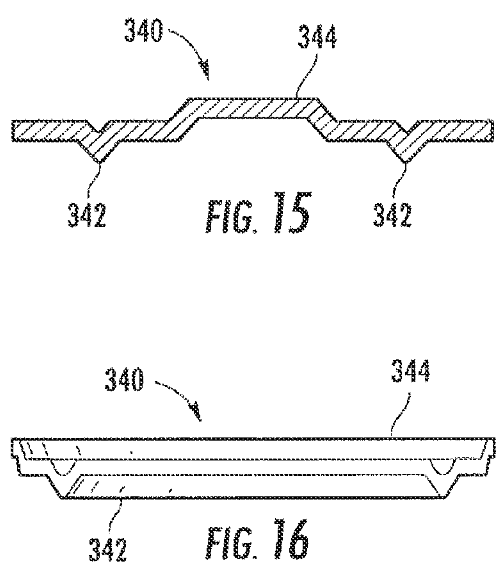
FIG. 15
FIG. 16
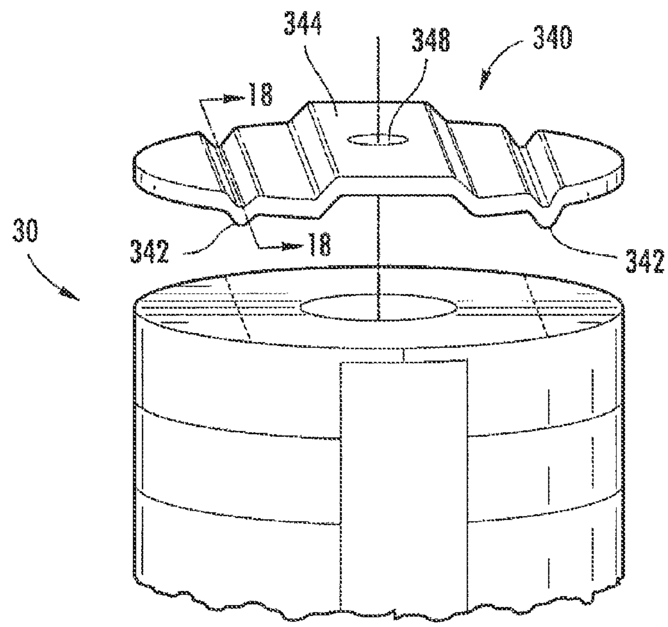
FIG. 17

24
638
30
46
25

74
72
640
70
644
650
642
72
47
24
638
30
46
25

74
76
70
644
650
642
76
47
638
642
640
646
648

650
644
658
125

174
172
170

CURRENT COLLECTOR FOR AN ELECTROMECHANICAL CELL

CROSS REFERENCE TO RELATED APPLICATIONS

This application is a continuation of U.S. patent application Ser. No. 13/087,277, filed Apr. 14, 2011, which is a continuation of International Patent Application No. PCT/US2009/065365, filed Nov. 20, 2009, which claims the benefit of and priority to U.S. Provisional Patent Application No. 61/116,993, filed Nov. 21, 2008 and U.S. Provisional Patent Application No. 61/172,148, filed Apr. 23, 2009. The entire disclosures of U.S. patent application Ser. No. 13/087,277, International Patent Application No. PCT/US2009/065365, U.S. Provisional Patent Application No. 61/116,993, and U.S. Provisional Patent Application No. 61/172,148 are incorporated herein by reference in their entireties.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles" (xEVs)) may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

One exemplary embodiment relates to a current collector for an electrochemical cell including a member having an outer member and an inner member coupled to the outer member by a plurality of flexible arms configured to allow the inner member to move relative to the outer member.

Another exemplary embodiment relates to flexible current collector for an electrochemical cell. The current collector includes an outer portion, and inner portion, and a plurality of connecting members. Each of the connecting members has a first end coupled to the outer portion and a second end coupled to the inner portion. The connecting members are configured to allow the inner portion to move relative to the outer portion.

Another exemplary embodiment relates to an electrochemical cell including a current collector including a member having an outer member and an inner member coupled to the outer member by a plurality of flexible arms configured to allow the inner member to move relative to the outer member.

BRIEF DESCRIPTION OF THE DRAWINGS

FIG. 8 is a top view of a current collector coupled to a cell element according to an exemplary embodiment.

FIG. 9 is an exploded perspective view of the current collector and cell element shown in FIG. 8.

FIG. 9A is a perspective view of the current collector shown in FIG. 9 coupled to the cell element shown in FIG. 9 with a tab of the current collector having been folded according to an exemplary embodiment.

FIG. 14 is a top view of a current collector according to another exemplary embodiment.

FIG. 15 is a cross-sectional view of the current collector shown in FIG. 14 taken along lines 15-15 in FIG. 14.

FIG. 16 is a side view of the current collector shown in FIG. 14.

FIG. 17 is a perspective view of the current collector shown in FIG. 14 being coupled to a cell element according to an exemplary embodiment.

DETAILED DESCRIPTION

Figure 1:
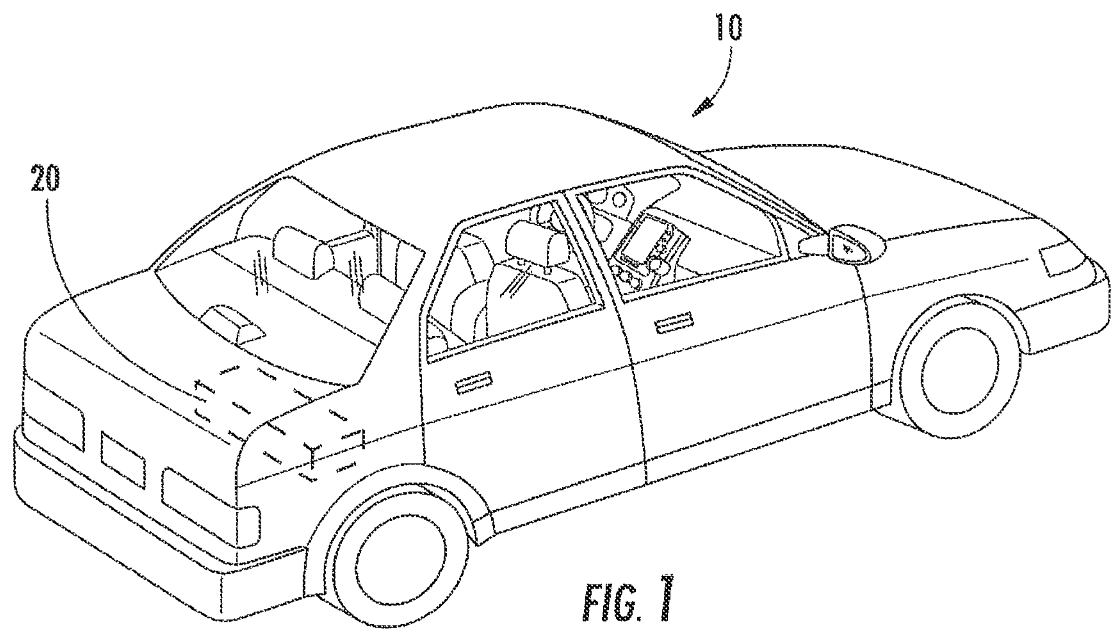
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
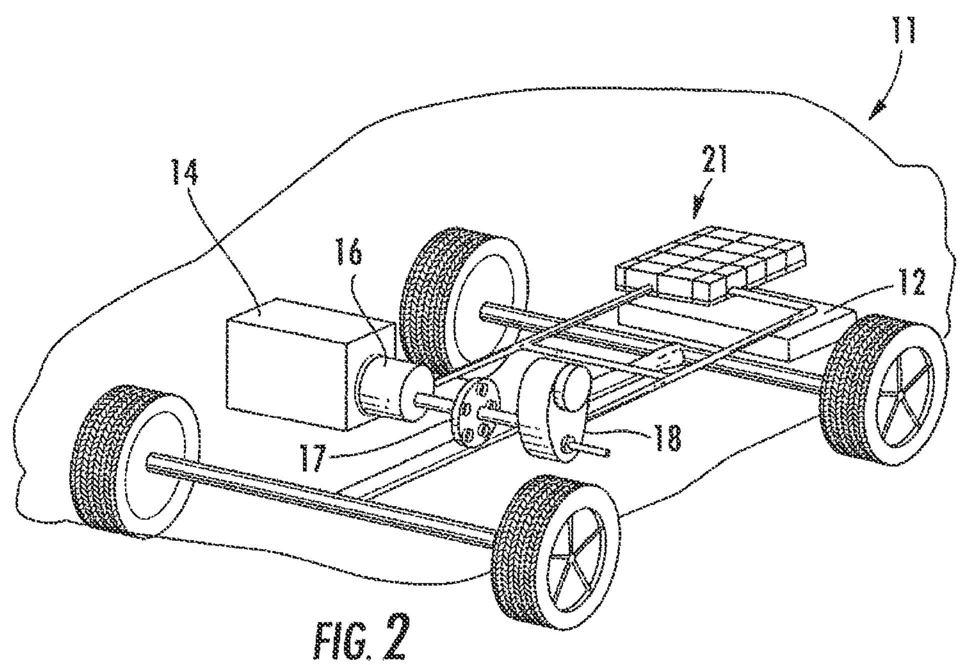
FIG. 2 is a cutaway schematic view of a vehicle including a battery module according to an exemplary embodiment.

FIG. 2 illustrates a cutaway schematic view of a vehicle 11 provided in the form of an HEV according to an exemplary embodiment. A battery system 21 is provided toward the rear of the vehicle 11 proximate a fuel tank 12 (the battery system 21 may be provided immediately adjacent the fuel tank 12 or may be provided in a separate compartment in the rear of the vehicle 11 (e.g., a trunk) or may be provided elsewhere in the vehicle 11). An internal combustion engine 14 is provided for times when the vehicle 11 utilizes gasoline power to propel the vehicle 11. An electric motor 16, a power split device 17, and a generator 18 are also provided as part of the vehicle drive system.

Such a vehicle 11 may be powered or driven by just the battery system 21, by just the engine 14, or by both the battery system 21 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 21, the type of vehicle 11, the type of vehicle technology (e.g., EV, HEV, PHEV, etc.), and the battery chemistry, among other features, may differ from those shown or described.

According to an exemplary embodiment, the battery system 21 includes a plurality of electrochemical batteries or cells. The battery system 21 may also include features or components for connecting the electrochemical cells to each other and/or to other components of the vehicle electrical system, and also for regulating the electrochemical cells and other features of the battery system 21. For example, the battery system 21 may include features that are responsible for monitoring and controlling the electrical performance of the battery system 21, managing the thermal behavior of the battery system 21, containment and/or routing of effluent (e.g., gases that may be vented from an electrochemical cell through a vent), and other aspects of the battery system 21.

Figures 3, 4, 5:
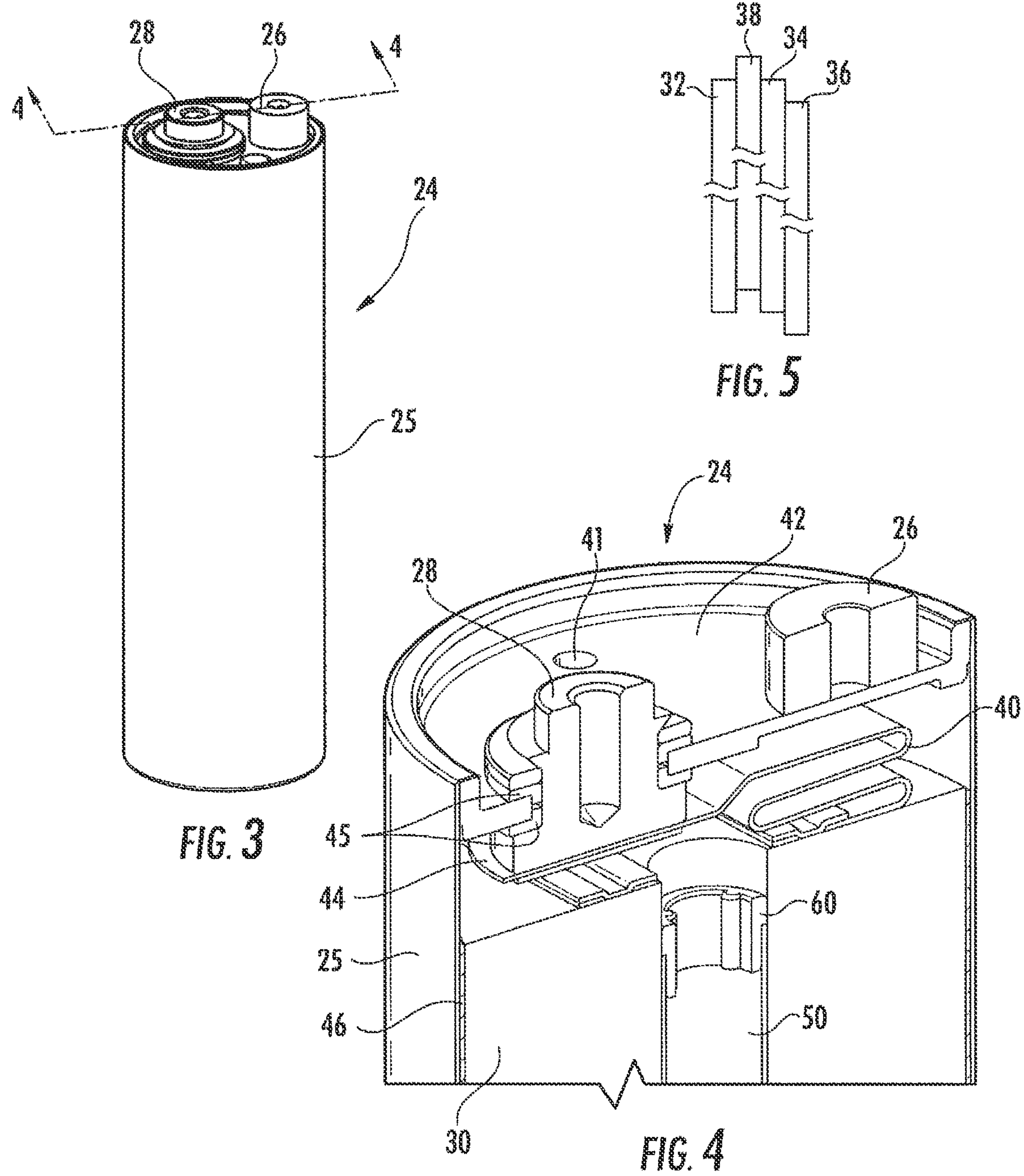
FIG. 3 is a perspective view of an electrochemical cell according to an exemplary embodiment.
FIG. 4 is a partial cross-sectional view of the electrochemical cell shown in FIG. 3 taken along line 4-4 in FIG. 3.
FIG. 5 is a partial cross-sectional view of electrodes and separators for an electrochemical cell according to an exemplary embodiment.

Referring now to FIG. 3, an isometric view of an electrochemical cell 24 is shown according to an exemplary embodiment. A battery system (such as battery system 20, 21) includes a plurality of such electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the cells 24 could have other physical configurations (e.g., oval, prismatic, polygonal, etc.). The capacity, size, design, terminal configuration, and other features of the cells 24 may also differ from those shown according to other exemplary embodiments.

FIG. 4 is a partial cross-sectional view of a cell 24 such as that shown in FIG. 3 taken along line 4-4 in FIG. 3. According to an exemplary embodiment, the cell 24 includes a container or housing 25, a cap or cover 42, a bottom portion (not shown), and a cell element 30. According to an exemplary embodiment, the housing 25 may be constructed from a conductive material such as a metal (e.g., aluminum or an aluminum alloy, copper or a copper alloy, etc.). According to an exemplary embodiment, the cell element 30 is a wound cell element. According to another exemplary embodiment, the cell element 30 may be a prismatic or oval cell element.

Figure 28:
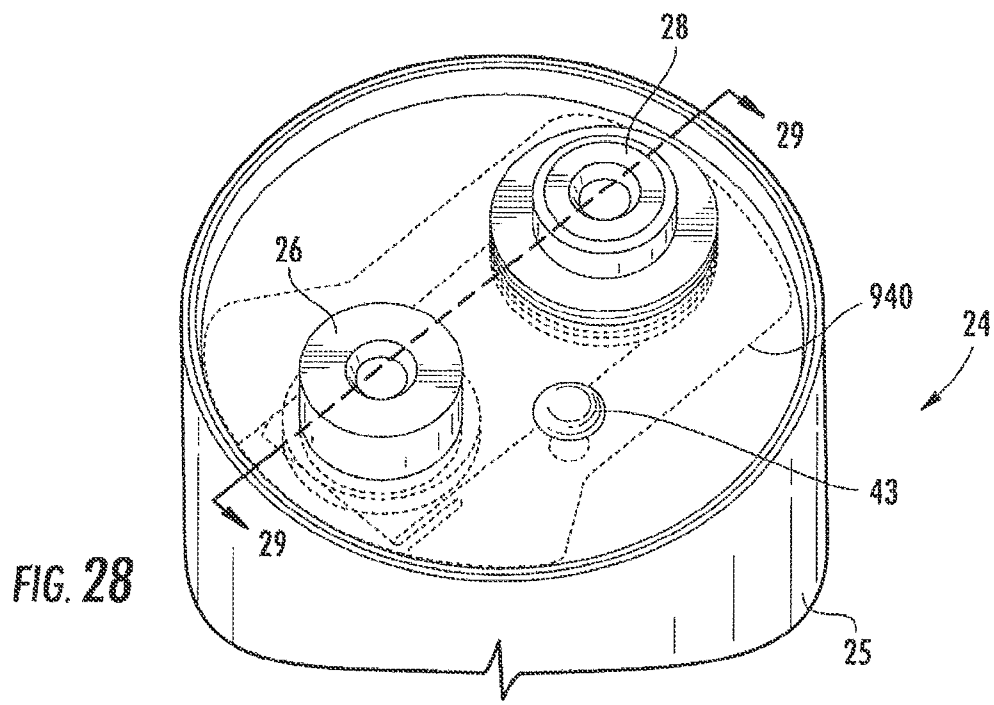
FIG. 28 is a perspective view of the current collector shown in FIGS. 25-27 provided in an electrochemical cell according to an exemplary embodiment.
Figure 29:
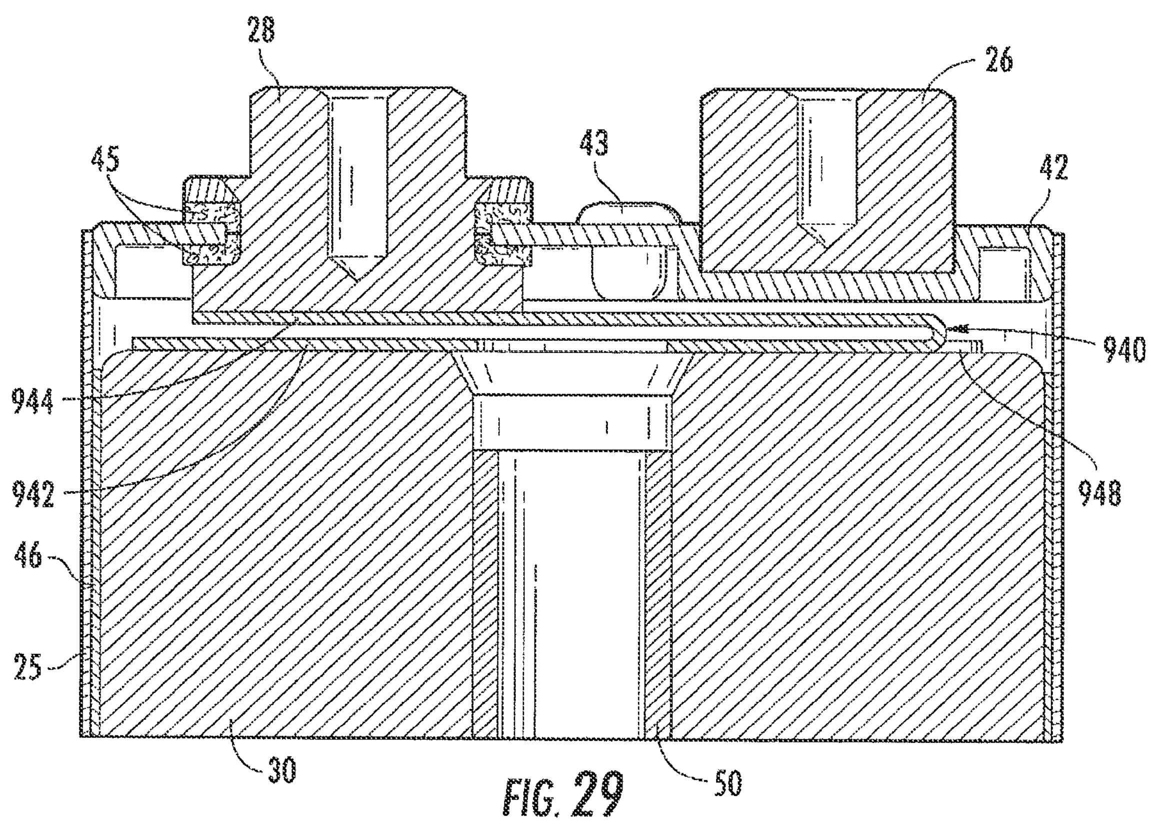
FIG. 29 is a cross-sectional view of the electrochemical cell shown in FIG. 28 taken along lines 29-29 in FIG. 28.

According to an exemplary embodiment, the cell element 30 includes at least one cathode or positive electrode 36, at least one anode or negative electrode 38, and one or more separators 32, 34. The separators 32, 34 are provided intermediate or between the positive and negative electrodes 36, 38 to electrically isolate the electrodes 36, 38 from each other. According to an exemplary embodiment, the cell 24 includes an electrolyte (not shown). According to an exemplary embodiment, the electrolyte is provided in the housing 25 of the cell 24 through a fill hole 41. After completion of filling the cell 24 with electrolyte, a fill plug (e.g., such as fill plug 43 as shown in FIGS. 28 and 29) may be provided in the fill hole 41 to seal the electrolyte inside the cell 24.

The cell 24 also includes a negative current collector 40 and a positive current collector (not shown). The negative current collector 40 and the positive current collector are conductive members that are used to couple the electrodes 36, 38 of the cell element 30 to the terminals 26, 28 of the cell 24. For example, the negative current collector 40 couples the negative electrode 38 to the negative terminal 28 (via a tab 44) and the positive current collector couples the positive electrode 36 to the positive terminal 26 of the cell 24 (e.g., via the housing 25). According to the exemplary embodiment shown in FIG. 4, the tab 44 of the negative current collector 40 has been at least partially folded or bent back over itself at least one time before being coupled to the negative terminal 28. According to an exemplary embodiment, the current collectors are coupled to the electrodes with a welding operation (e.g., a laser welding operation).

According to an exemplary embodiment, the cell element 30 has a wound configuration in which the electrodes 36, 38 and separators 32, 34 are wound around a member or element provided in the form of a tube or mandrel 50. Such a configuration may be referred to alternatively as a jelly roll configuration. Although the mandrel 50 is shown as being provided as having a generally cylindrical shape, according to other exemplary embodiments, the mandrel 50 may have a different configuration (e.g., it may have an oval or rectangular cross-sectional shape, etc.). It is noted that the cell element 30, although shown as having a generally cylindrical shape, may also have a different configuration (e.g., it may have an oval, prismatic, rectangular, or other desired cross-sectional shape).

According to another exemplary embodiment, the electrochemical cell 24 may be a prismatic cell having prismatic or stacked cell elements (not shown). In such an embodiment, the positive and negative electrodes 36, 38 are provided as plates that are stacked upon one another in an alternating fashion, with the separators 32, 34 provided intermediate or between the positive and negative electrodes 36, 38 to electrically isolate the electrodes 36, 38 from each other.

According to an exemplary embodiment, the positive electrode 36 is offset from the negative electrode 38 in the axial direction as shown in the partial cross-sectional view shown in FIG. 5. Accordingly, at a first end of the cell element 30, the wound positive electrode 36 will extend further than the negative electrode 38, and at a second (opposite) end of the cell element 30, the negative electrode 38 will extend further than the positive electrode 36.

One advantageous feature of such a configuration is that current collectors may be connected to a specific electrode at one end of the cell 24 without contacting the opposite polarity electrode. For example, according to an exemplary embodiment, a negative current collector 40 (e.g., as shown in FIG. 4) may be connected to the exposed negative electrode 38 at one end of the cell element 30 and a positive current collector (not shown) may be connected to the exposed positive electrode 36 at the opposite end of the cell element 30.

According to an exemplary embodiment, the negative current collector 40 electrically connects the negative electrode 38 to the negative terminal 28 of the cell 24. The negative terminal 28 is insulated from the cover 42 of the housing 25 by an insulator 45, as shown in FIG. 4. According to an exemplary embodiment, the positive current collector (not shown) electrically connects the positive electrode 36 to a bottom of the housing 25. The housing 25 is electrically connected to the cover 42 (e.g., as shown in FIG. 4), which in turn is electrically connected to the positive terminal 26.

Figure 6:
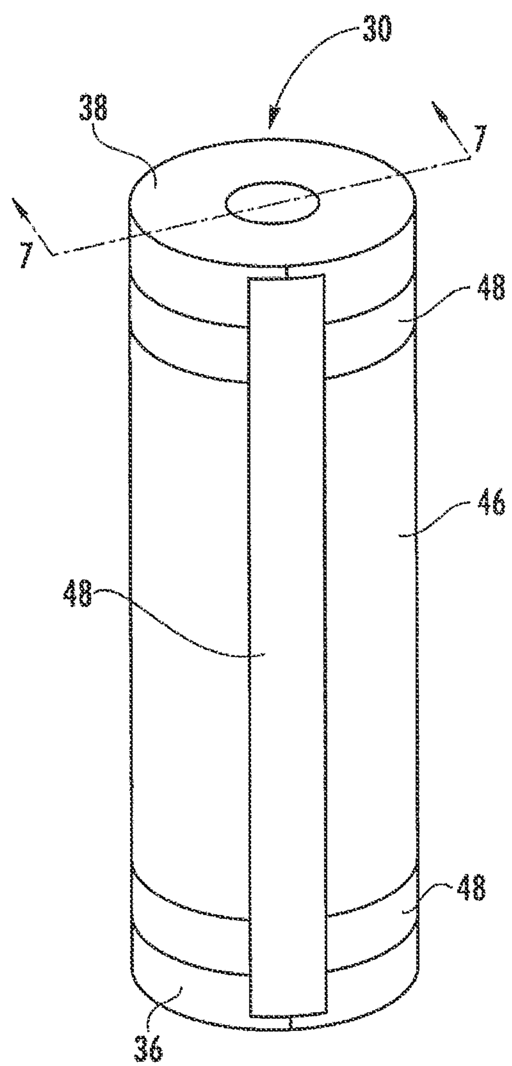
FIG. 6 is a perspective view of a cell element provided in the form of a jelly roll configuration according to an exemplary embodiment.
Figure 7:
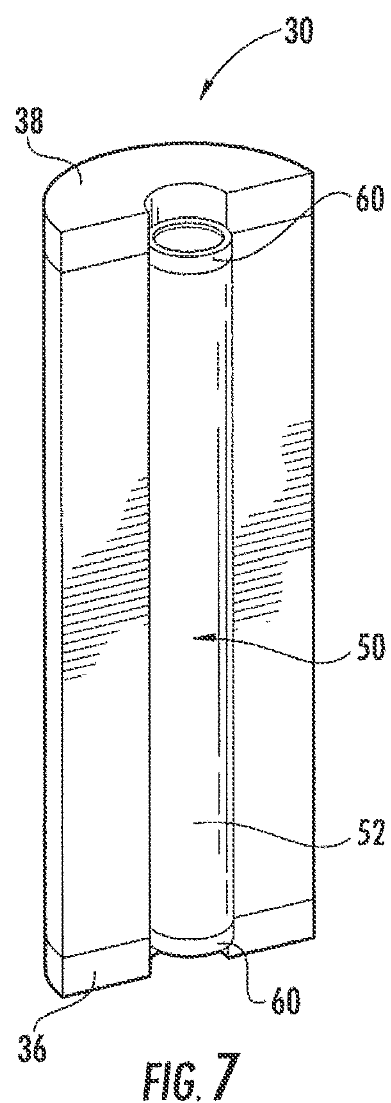
FIG. 7 is a cross-sectional view of the cell element shown in FIG. 6 taken along line 7-7 in FIG. 6.
Figure 10:
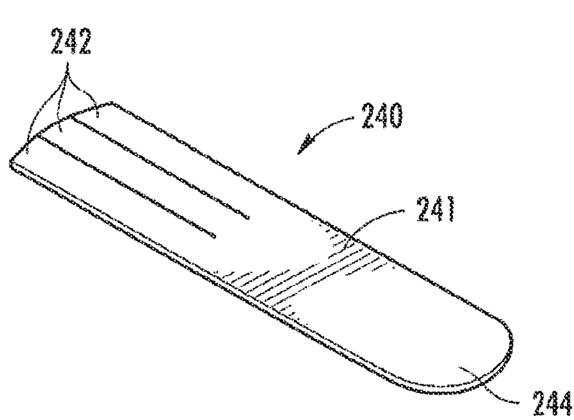
FIG. 10 is a perspective view of a current collector according to another exemplary embodiment.
Figure 11:
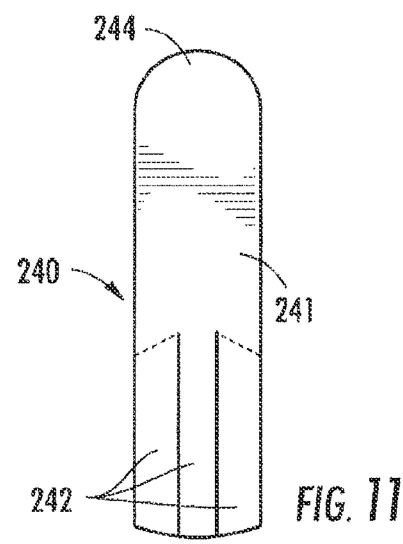
FIG. 11 is a top view of the current collector shown in FIG. 10.

FIGS. 6-7 illustrate an exemplary embodiment of a wound cell element 30 (e.g., a jelly roll) in which electrodes 36, 38 and separators 32, 34 (not shown) are wound around a member or element provided in the form of a mandrel 50 (e.g., a body, center member, shaft, rod, tube etc.). According to an exemplary embodiment, an adhesive or tape 48 (e.g., as shown in FIG. 6) may be used to position an electrically-insulating wrap or film 46 (e.g., as shown in FIGS. 4 and 6) around the cell element 30 in order to at least partially electrically insulate the cell element 30 from the housing 25. According to an exemplary embodiment, the film 46 is a polymide material such as is commercially available under the trade name Kapton® from E. I. du Pont de Nemours and Company.

According to an exemplary embodiment, the mandrel 50 is provided in the form of an elongated hollow tube 52 and is configured to allow gases from inside the electrochemical cell to flow from one end of the electrochemical cell (e.g., the top) to the other end of the electrochemical cell (e.g., the bottom). According to another exemplary embodiment, the mandrel 50 may be provided as a solid tube.

The mandrel 50 is illustrated, for example, in FIG. 7 as being provided within the center of the cell element 30. According to an exemplary embodiment, the mandrel 50 does not extend all the way to the very top and bottom of the cell element 30. According to other exemplary embodiments, the mandrel 50 may extend all the way to the top and/or bottom of the cell element 30.

Still referring to FIGS. 6-7, according to an exemplary embodiment, the mandrel 50 includes at least one (i.e., one or more) element or drive member 60 joined to an end of the hollow tube 52. According to an exemplary embodiment, the drive members 60 are configured to electrically insulate the hollow tube 52 from the electrodes 36, 38. According to another exemplary embodiment, the hollow tube 52 may be provided in electrical contact with one of the electrodes while being electrically insulated from the other electrode. For example, according to an exemplary embodiment, the hollow tube 52 may be electrically coupled to the positive electrode 36 (or negative electrode 38), while the hollow tube 52 is electrically isolated from the negative electrode 38 (or positive electrode 36) by the drive member 60.

According to an exemplary embodiment, the drive members 60 are formed from an electrically-insulating material such as a polymeric material or other suitable material (e.g., a plastic resin) and the hollow tube 52 is formed from an electrically (and thermally) conductive material such as a metallic material or other suitable material (e.g., aluminum or aluminum alloy). According to another exemplary embodiment, the drive members 60 are formed from an electrically (and thermally) conductive material such as a metallic material or other suitable material (e.g., aluminum or aluminum alloy) and the hollow tube 52 is formed from an electrically-insulating material such as a polymeric material or other suitable material (e.g., a plastic resin). According to another exemplary embodiment, both the drive members 60 and the hollow tube 52 are formed from an electrically-insulating material such as a polymeric material or other suitable material (e.g., a plastic resin).

One advantageous feature of the mandrels 50 as described above is that the drive members 60 coupled to the hollow tube 52 keep the positive and negative electrodes 36, 38 electrically separated from each other. Additionally, when the hollow tube 52 of the mandrel 50 is formed from a relatively low cost material (e.g., a drawn aluminum tube or extruded aluminum tube), the mandrel 50 may have a lower cost as compared to other mandrels in which the entire assembly is made of a polymeric material.

According to other exemplary embodiments, other configurations of the cell element 30 may be used that do not include the mandrel 50 or the drive members 60 (e.g., a prismatic cell element). Additionally, while the cell 24 in FIGS. 4 and 6 is shown according to an exemplary embodiment as having the exposed negative electrode 38 proximate to the top of the cell 24 and the exposed positive electrode 36 proximate to the bottom of the cell 24, according to other exemplary embodiments, the orientation of the cell element 30 (and thus the positions of the current collectors) may be reversed. Additionally, according to other exemplary embodiments, the terminals 26, 28 of the cell 24 may be provided on opposite ends of the cell 24 (e.g., a negative terminal 28 may be provided on the top of the cell 24 and a positive terminal 26 may be provided on the bottom of the cell 24).

Referring now to FIGS. 8-9A, a member or element provided in the form of a current collector or collector plate 140 is shown according to an exemplary embodiment. According to an exemplary embodiment, the current collector 140 is provided in the form of a generally flat member with a plurality of legs or extensions 142 and an extension or tab 144 (formed, e.g., by a stamping operation, a laser cutting operation, etc.). According to an exemplary embodiment, the current collector 140 may be formed from a material having a thickness of between approximately 1 and 2 millimeters, but may have a greater or lesser thickness according other exemplary embodiments. According to various exemplary embodiments, the current collector 140 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

As shown, the legs 142 are configured to extend across one end of the cell element 30 to contact the edge of the exposed electrode (e.g., the negative electrode 38). According to another exemplary embodiment, the legs 142 may extend only partially across the end of the cell element 30. While three legs 142 are shown in the exemplary embodiment of FIGS. 8-9A, according to other exemplary embodiments, the current collector 140 may have a greater or lesser number of legs 142.

As shown in FIG. 9A, according to an exemplary embodiment, the extension or tab 144 is configured to be folded away from the cell element 30 and at least partially back over the main body 141 of the current collector 140. The tab 144 is configured to be coupled to the housing of the cell or to a terminal of the cell to create a conductive path between the electrode and the housing or terminal (e.g., similar to that shown in FIG. 4). According to another exemplary embodiment, the tab 144 may be folded or bent at least partially over itself multiple times (e.g., similar to that shown in FIG. 4). The tab 144 provides a substantially flexible connection between the electrode of the cell element 30 and the terminal or housing and allows the cell element 30 to move relative to the terminal or housing if required.

As best seen in FIG. 8, the ends of the legs 142 may include a rounded or curved shape to complement the perimeter of the cell element 30. According to other exemplary embodiments, the legs 142 (including the ends of the legs) may have other shapes and/or sizes. According to an exemplary embodiment, the legs 142 of the current collector are separated from one another by an Angle A of approximately 120 degrees. According to other exemplary embodiments, the legs 142 may be separated from one another by a greater or smaller angle.

According to an exemplary embodiment, the current collector 140 may be coupled to the electrode with a welding operation (e.g., a laser welding operation) along the legs 142 of the current collector 140 (e.g., such as along weld lines 146 as shown in FIG. 8). As such, the welding occurs radially with respect to the end of the cell element 30. This allows for more efficient current flow from the electrode of the cell element 30 to the current collector 140, because the edge of the wound electrode is coupled (e.g., welded) to the current collector 140 (via the legs 142) multiple times. Additionally, radial welds on a wound cell element (such as shown in FIG. 9) allow the weld to occur substantially perpendicular to the edge of the electrode, providing for better weld control and repeatability of the weld from one cell to the next. According to an exemplary embodiment, the welding of the current collector 140 to the electrode is done prior to the folding of the tab 144, but may occur at a different time according to other exemplary embodiments.

Referring now to FIGS. 10-12B, a current collector 240 is shown according to another exemplary embodiment. The current collector 240 is similar to the current collector 140 of FIGS. 8-9, except the current collector 240 of FIGS. 10-12B is formed as a relatively narrow elongated strip of material (to allow for the efficient use of material). According to an exemplary embodiment, the current collector 240 may be formed from a material having a thickness of between approximately 1 and 2 millimeters, but may have a greater or lesser thickness according other exemplary embodiments. According to various exemplary embodiments, the current collector 240 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

The legs 242 are formed (e.g., by a stamping operation, a laser cutting operation, etc.) by a series of generally parallel cuts at one end of the strip of material in a longitudinal direction. To form the current collector 240, according to an exemplary embodiment, the outer legs 242 are folded or otherwise manipulated outward at an angle (see FIG. 12) of approximately 120 degrees from one another. According to other exemplary embodiments, the outer legs may be folded at an angle that is greater or smaller than 120 degrees.

According to an exemplary embodiment, the legs 242 of the current collector 240 are configured to extend across the end of the electrode of the cell element 30 to contact the edge of the exposed electrode (e.g., the negative electrode or the positive electrode). According to another exemplary embodiment, the legs 242 may extend only partially across the end of the wound electrode. While three legs 242 are shown in the exemplary embodiment of FIGS. 10-12, according to other exemplary embodiments, the current collector 240 may have a greater or lesser number of legs.

Figure 12:
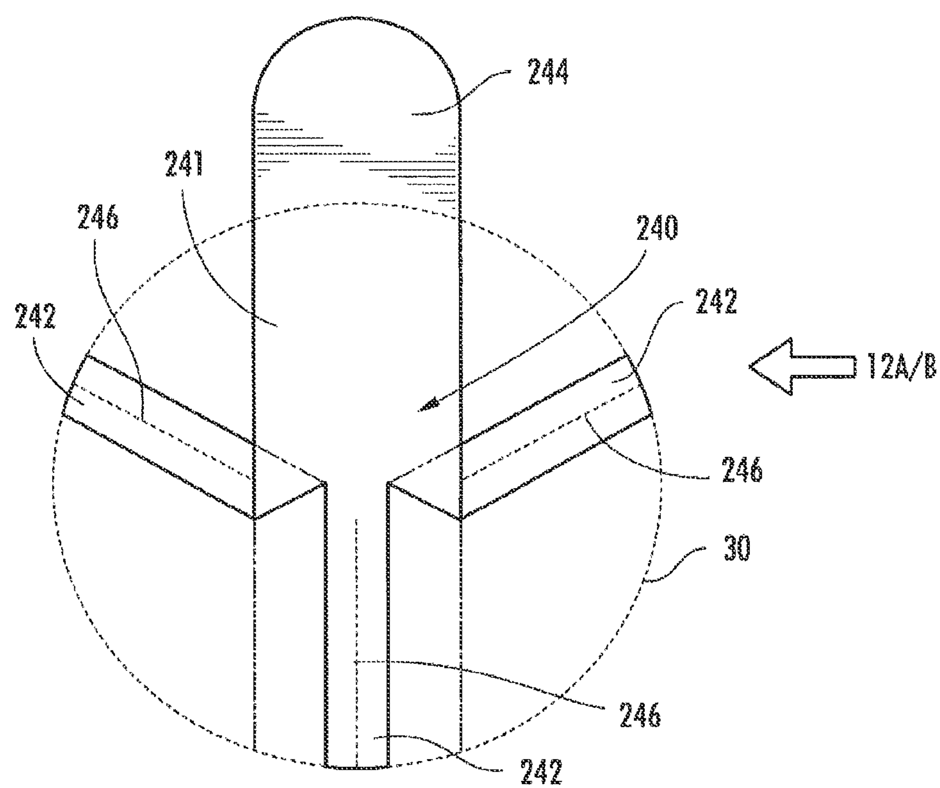
FIG. 12 is a top view of the current collector shown in FIG. 10 shown coupled to a cell element according to an exemplary embodiment.
Figure 12A:
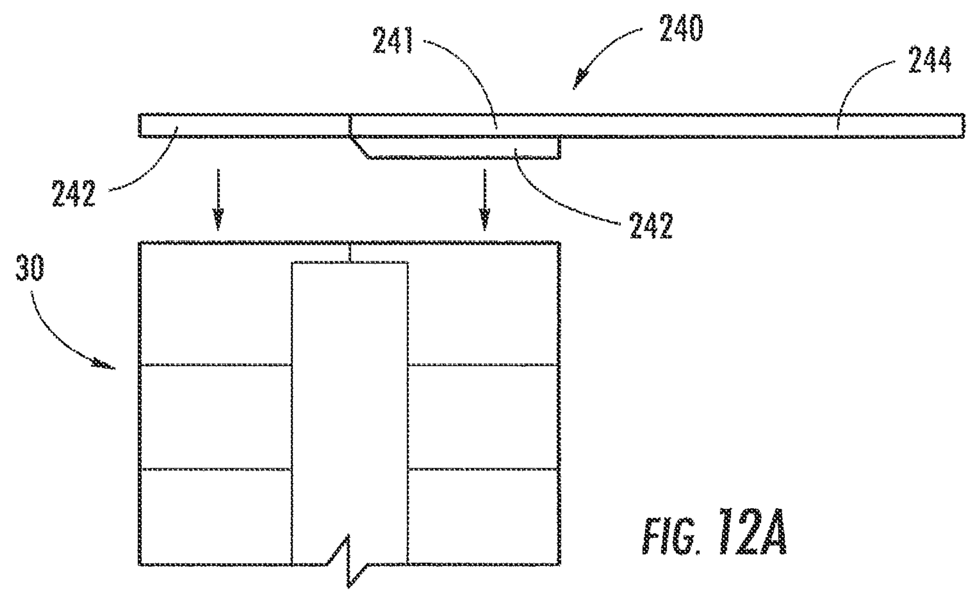
FIG. 12A is an exploded side view of the current collector and cell element shown in FIG. 12 according to an exemplary embodiment.
Figure 12B:
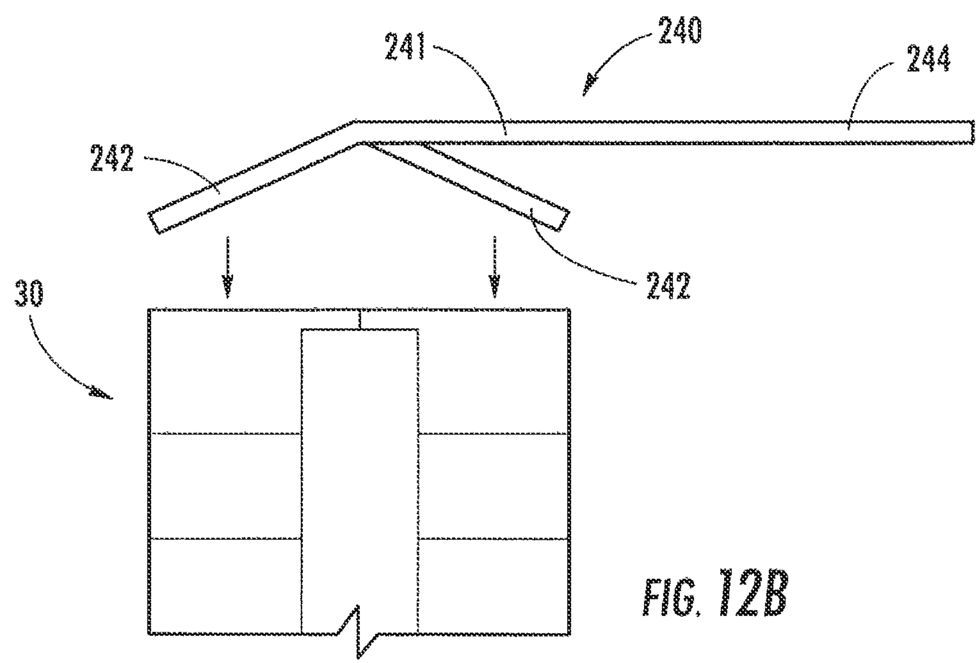
FIG. 12B is an exploded side view of the current collector and cell element shown in FIG. 12 according to another exemplary embodiment.
Figure 13A:
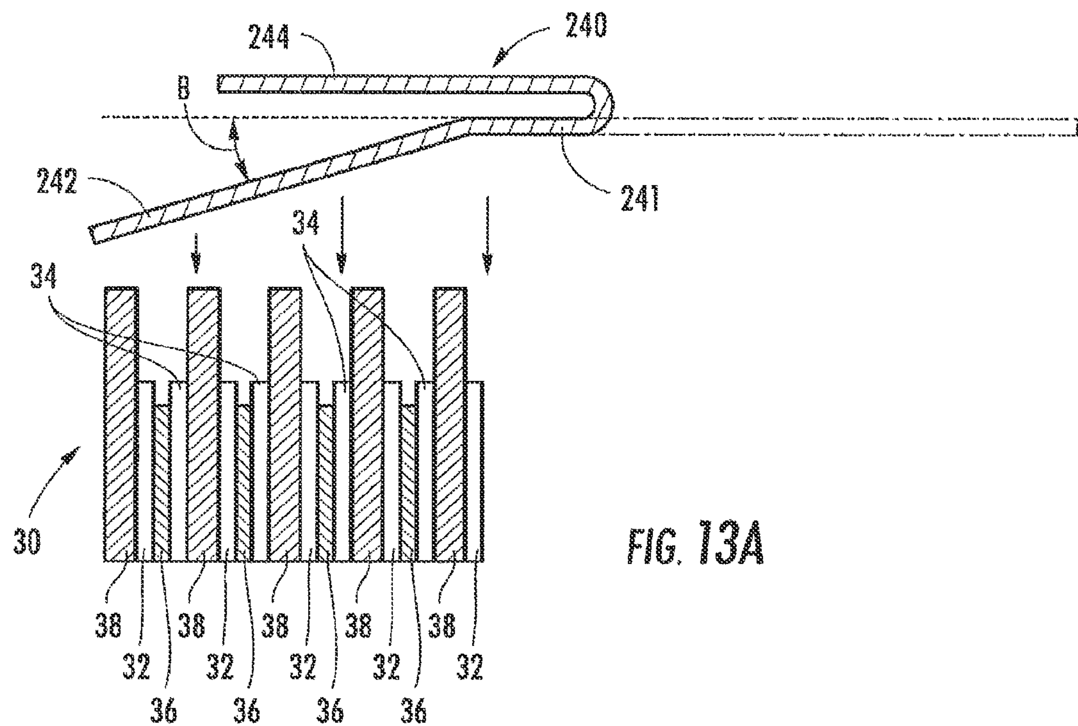
FIG. 13A is a partial cross-sectional schematic view of the current collector and cell element shown in FIG. 12B with a tab of the current collector having been folded according to an exemplary embodiment.

As shown in FIG. 12A, according to one exemplary embodiment, the outer legs 242 may be bent or folded under the main body 241 of the current collector 240 such that the outer legs 242 are substantially parallel to the inner leg 242. As shown in FIG. 12B, according to another exemplary embodiment, the outer legs 242 may be bent or folded under the main body 241 of the current collector 240 such that the outer legs 242 are at an angle with respect to the plane of the main body 241 (e.g., such as Angle B as shown in FIG. 13A). Additionally, as shown in FIG. 12B, the inner leg 242 may be bent or folded towards the cell element 30 such that the inner leg 242 is at an angle with respect to the plane of the main body 241 (e.g., such as Angle B as shown in FIG. 13A). According to an exemplary embodiment, the inner leg 242 may be bent or folded before, after, or consecutively with the bending or folding of the outer legs 242.

The current collector 240 may be coupled to the electrode with a welding operation (e.g., a laser welding operation) along the legs 242 of the current collector 240 (e.g., such as along weld lines 246 as shown in FIG. 12). As such, the welding occurs radially with respect to the edge of the electrode of the cell element 30. Similarly to as stated above, radial welding allows for more efficient current flow from the electrode of the cell element 30 to the current collector 240, and for better weld control and repeatability of the weld from one cell to the next. According to an exemplary embodiment, the welding of the current collector 240 to the electrode is done prior to the folding of the tab 244, but may occur at a different time according to other exemplary embodiments.

Figure 13B:
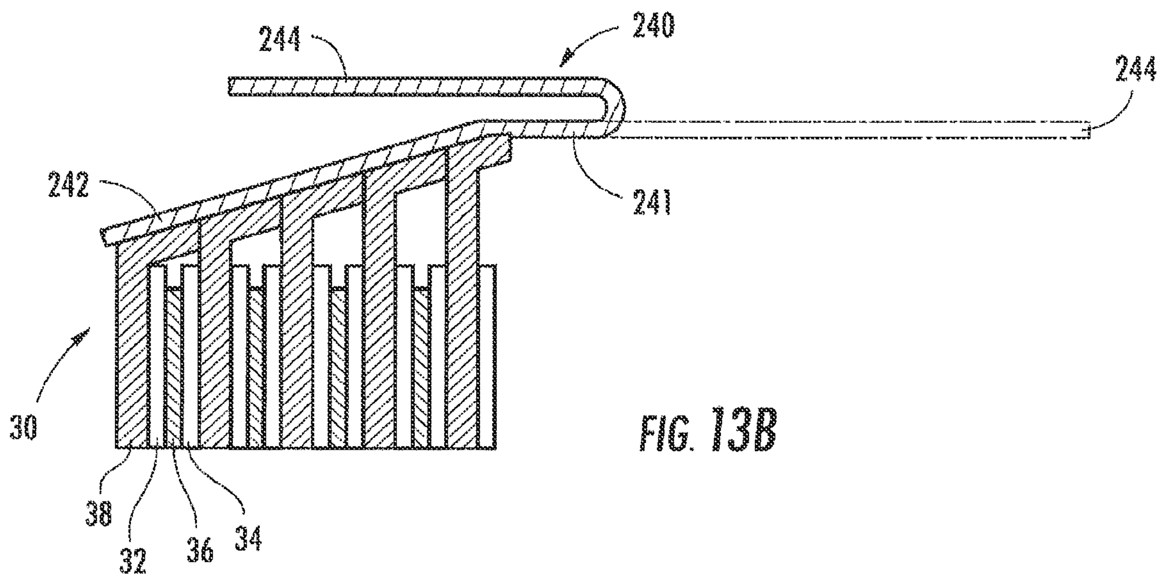
FIG. 13B is a partial cross-sectional schematic view of the current collector shown in FIG. 13A coupled to the cell element shown in FIG. 13A according to an exemplary embodiment.

The current collector 240 also includes an extension or tab 244 that is configured to be folded away from the cell element 30 and/or at least partially back over the main body 241 of the current collector 240 (e.g., such as shown in FIGS. 13A and 13B). The tab 244 is configured to be coupled to the housing of the cell or to a terminal of the cell to create a conductive path between the electrode and the housing or terminal (e.g., similar to that as shown in FIG. 4). According to another exemplary embodiment, the tab 244 may be folded or bent at least partially over itself multiple times (e.g., similar to that as shown in FIG. 4). The tab 244 provides a substantially flexible connection between the electrode and the terminal or housing and allows the cell element 30 to move relative to the terminal or housing.

Referring to FIGS. 13A and 13B, the inner leg 242 of the current collector 240 may be at an angle with respect to the plane of the tab 244, shown as Angle B (for clarity, the outer legs 242 are not shown). It is noted that the legs 142 of the current collector 140 (e.g., as shown in FIGS. 8-9A) may also be at an angle with respect to the plane of the tab (e.g., such as shown in FIGS. 13A and 13B). For clarity, only the current collector 240 is discussed below, although one of ordinary skill in the art would know that the embodiment discussed below may also apply to the embodiment shown in FIGS. 8-9A or other embodiments not discussed.

Referring to FIGS. 13A and 13B, Angle B is chosen so that the legs 242 of the current collector 240 bend or crush the edge or side of the electrode (e.g., the negative electrode 38) as the legs 242 make contact with the edge of the electrode as the legs 242 are brought down to contact the edge of the electrode (see, e.g., FIG. 13B). Because the electrodes of the cell element 30 are wound, each of the electrodes will have multiple portions extending from the edge of each electrode. The legs 242 of the current collector 240 may then be coupled to the multiple portions of the edge of the electrode by a welding operation (e.g., a laser welding operation).

The multiple portions of the edge of the electrode are bent or crushed so that they contact one another to create a substantially continuous surface. The substantially continuous surface allows for better control of the penetration of the weld. By controlling the penetration of the weld, a stronger, higher quality, and more repeatable weld may be formed than is possible with an electrode that hasn't been deformed (e.g., an electrode that hasn't had the multiple portions of the edge of the electrode bent to touch one another). The tab 244 of the current collector 240 is then coupled to the housing of the cell or to the terminal of the cell to create a conductive path between the electrode and the housing or terminal.

To create a high quality and repeatable weld between the current collector 240 and the electrode, it is desirable for the legs 242 of the current collector 240 to contact as many of the multiple portions of the edge of the electrode as possible. According to an exemplary embodiment, Angle B is between approximately 0 degrees and 30 degrees, but may have an angle that is greater or smaller according to other exemplary embodiments. According to a particular exemplary embodiment, Angle B is between approximately 15 and 25 degrees. According to another particular exemplary embodiment, Angle B is approximately 20 degrees.

Referring now to FIGS. 14-17, a member or element provided in the form of a current collector or collector plate 340 is shown according to another exemplary embodiment. According to one exemplary embodiment, the current collector 340 is provided as a disc-like member that includes one or more projections, ridges, or protrusions 342 that extend along one side of the current collector 340. The protrusions 342 of the current collector 340 have corresponding grooves, valleys, troughs, depressions, etc. on the opposite side of the current collector 340. According to other exemplary embodiments, the protrusions 342 may not have corresponding grooves, valleys, troughs, depressions, etc. on the opposite side of the current collector 340. According to one exemplary embodiment, the protrusions 342 are configured to crush or compress the multiple portions of the edge of the exposed electrode (e.g., the positive electrode 36) at an end of the cell element 30 so that the multiple portions contact one another (e.g., as shown in FIG. 18B).

The current collector 340 may be formed (e.g., extruded, stamped, etc.) such that one or more protrusions 342, shown as generally V-shaped ridges, extend from a surface of the current collector 340. According to an exemplary embodiment, a tip or edge of the protrusions 342 may have a pointed profile. According to another exemplary embodiment, the tip or edge of the protrusions 342 may have a rounded profile. According to other exemplary embodiments, the protrusions 342 may extend all the way across the current collector 340 (e.g., as shown in FIG. 14) or may extend only partially across the current collector 340.

According to another exemplary embodiment, the current collector 340 may substantially match the size and shape of the end of the cell element 30. According to other exemplary embodiments, the current collector 340 may be provided in other shapes and/or sizes (e.g., the current collector 340 may cover only a portion of the end of the cell element 30). According to an exemplary embodiment, the current collector 340 may be formed from a material having a thickness of between approximately 1 and 2 millimeters, but may have a greater or lesser thickness according other exemplary embodiments. According to various exemplary embodiments, the current collector 340 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

The current collector 340 is coupled to the exposed edge of an electrode (e.g., the positive electrode 36) of the cell element 30 with a welding operation (e.g., a laser welding operation). According to an exemplary embodiment, the current collector 340 is welded to the electrode along the protrusions 342 of the current collector 340 (e.g., such as along weld lines 346 as shown in FIG. 14).

Figure 18A:
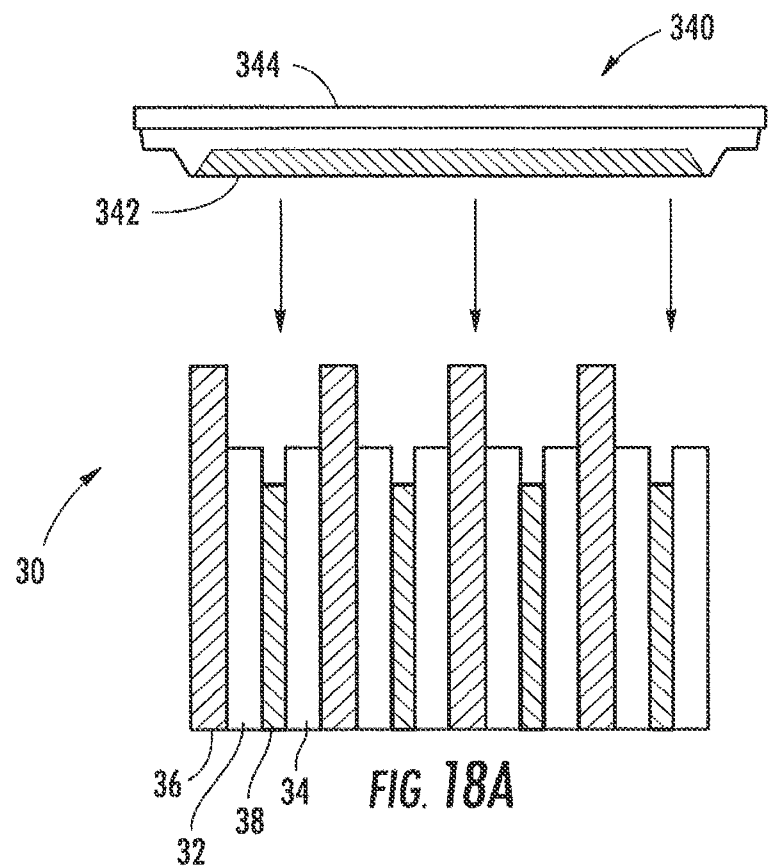
FIG. 18A is a partial cross-sectional schematic view of the current collector and cell element shown in FIG. 17 taken along line 18-18 in FIG. 17.
Figure 18B:
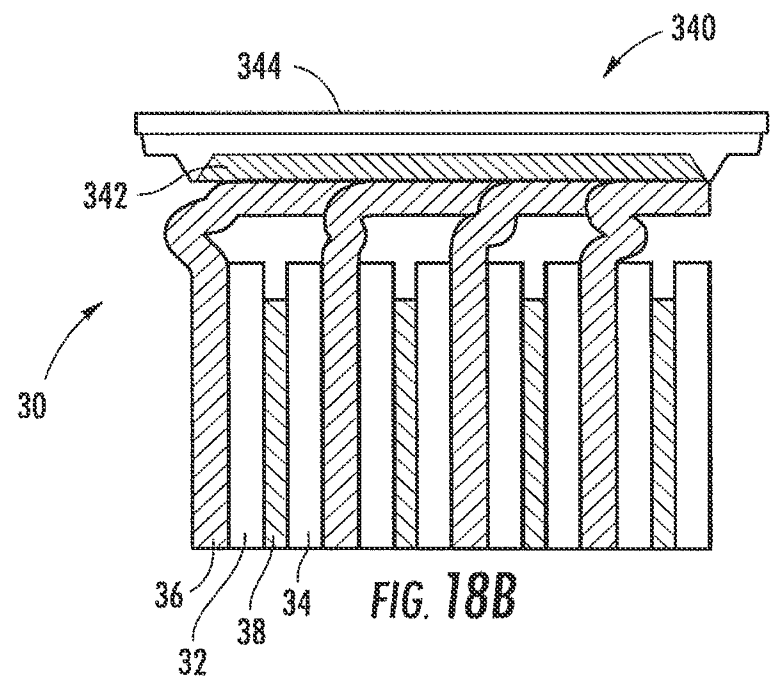
FIG. 18B is a partial cross-sectional schematic view of the current collector shown in FIG. 18A coupled to the cell element shown in FIG. 18A according to an exemplary embodiment.

Referring to FIGS. 18A-18B, the protrusions 342 of the current collector 340 are configured to crush, bend, or otherwise deform the multiple portions of the exposed edge of the positive electrode 36 when the current collector 340 is coupled to the cell element 30. The protrusions 342 cause the multiple portions of the edge of the electrode to contact each other to create a substantially continuous surface. The substantially continuous surface allows for better control of the penetration of the weld. By controlling the penetration of the weld, a stronger, higher quality, and more repeatable weld may be formed than is possible with an electrode that has not been deformed.

A surface 344 of the current collector 340 is then coupled to the housing of the cell or to the terminal to create a conductive path between the electrode and the housing or terminal. According to an exemplary embodiment, the surface 344 may include a hole or aperture 348 (e.g., as shown in FIG. 17) that is generally aligned with the center of the cell element 30.

Figure 19:
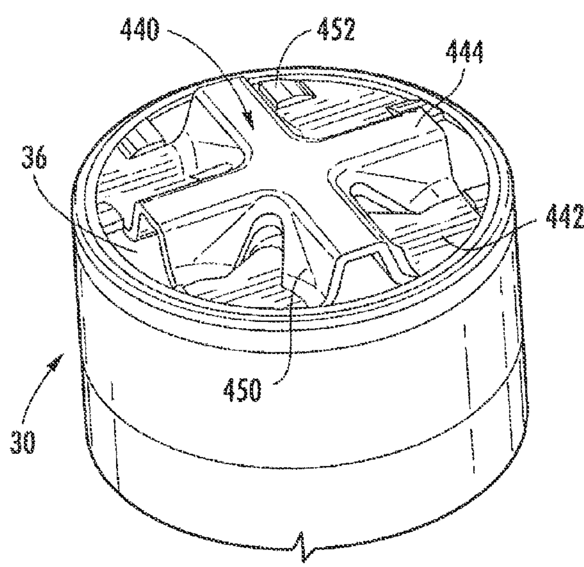
FIG. 19 is a perspective view of a current collector coupled to a cell element according to another exemplary embodiment.
Figure 19A:
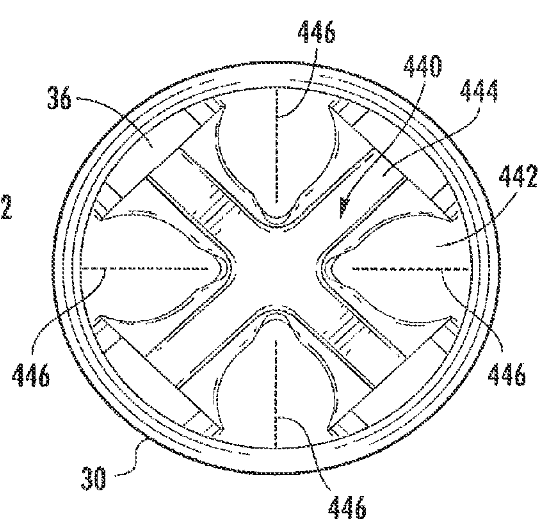
FIG. 19A is a top view of the current collector shown in FIG. 19.

Referring now to FIGS. 19 and 19A, a member or element provided in the form of a current collector or collector plate 440 is shown according to another exemplary embodiment. The current collector 440 may be formed by a stamping operation (e.g., from a sheet metal material). According to an exemplary embodiment, the current collector 440 may be formed from a material having a thickness of between approximately 1 and 2 millimeters, but may have a greater or lesser thickness according other exemplary embodiments. According to various exemplary embodiments, the current collector 440 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

According to an exemplary embodiment, the current collector 440 includes one or more lower portions 442 that are configured to be coupled to an electrode (e.g., the positive electrode 36). The current collector 440 also includes one or more upper portions 444 that are configured to be coupled to the housing of the cell or to the terminal of the cell to create a conductive path between the electrode and the housing or terminal. According to the exemplary embodiment shown in FIG. 19, the current collector 440 includes four lower portions 442 and four upper portions 444. According to other exemplary embodiments, the current collector 440 may have greater or fewer upper and/or lower portions.

According to an exemplary embodiment, each of the lower portions 442 are connected to the upper portion by a member shown as a sidewall or shoulder 450. As shown in FIG. 19, the shoulders 450 may have a generally rounded profile and may smoothly transition from the lower portion 442 to the upper portion 444. According to another exemplary embodiment, each of the lower portions 442 includes at least one projection or protrusion 452.

According to an exemplary embodiment, the current collector 440 is coupled to exposed portions of the edge of the positive electrode 36 by a welding operation (e.g., a laser welding operation) along the lower portions 442 of the current collector 440 (e.g., such as along weld lines 446 as shown in FIG. 19A). According to one exemplary embodiment, the lower portions 442 may contact, bend, or deform the exposed portions of the edge of the electrode 36 prior to welding (e.g., similar to that as shown in FIG. 18B). According to another exemplary embodiment, the exposed portions of the edge of the electrode 36 may be deformed prior to coupling the current collector 440 to the electrode 36. The current collector 440 may then be coupled to the cell housing or a terminal with another welding operation along the upper portions 444 of the current collector 440.

Figure 20:
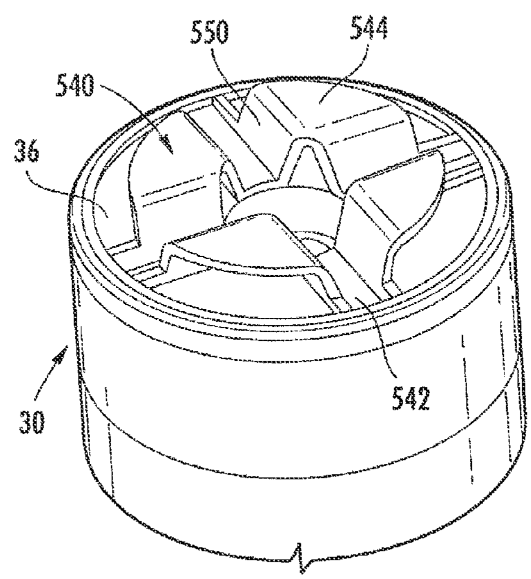
FIG. 20 is a perspective view of a current collector coupled to a cell element according to another exemplary embodiment.
Figure 20A:
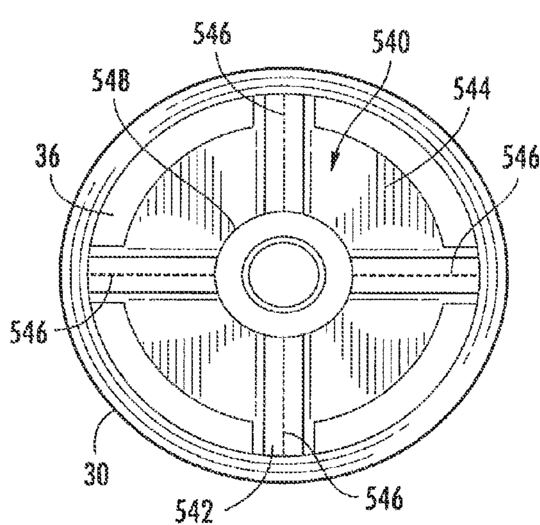
FIG. 20A is a top view of the current collector shown in FIG. 20.

Referring now to FIGS. 20 and 20A, a member or element provided in the form of a current collector or collector plate 540 is shown according to another exemplary embodiment. The current collector 540 may be formed by a stamping operation (e.g., from a sheet metal material). According to an exemplary embodiment, the current collector 540 may be formed from a material having a thickness of between approximately 1 and 2 millimeters, but may have a greater or lesser thickness according other exemplary embodiments. According to various exemplary embodiments, the current collector 540 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

According to an exemplary embodiment, the current collector 540 includes one or more lower portions 542 that are configured to be coupled to an electrode (e.g., the positive electrode 36). The current collector 540 also includes one or more upper portions 544 that are configured to be coupled to the housing of the cell or to the terminal of the cell to create a conductive path between the electrode and the housing or terminal. According to the exemplary embodiment shown in FIG. 20, the current collector 540 includes four lower portions 542 and four upper portions 544. According to other exemplary embodiments, the current collector 540 may have greater or fewer upper and/or lower portions. According to an exemplary embodiment, an opening or aperture 548 is included in the current collector 540. The aperture 548 has a central axis that is generally aligned with the central axis of the cell element 30.

According to an exemplary embodiment, each of the lower portions 542 are connected to the upper portion by a member shown as a sidewall or shoulder 550. As shown in FIG. 20, the shoulders 550 may have a generally rounded profile and may smoothly transition from the lower portion 542 to the upper portion 544. According to another exemplary embodiment, each of the lower portions 542 extends to the perimeter of the cell element 30, while the upper portions 544 extend only partially across the cell element 30. According to various exemplary embodiments, the lower portions 542 and/or upper portions 544 may have other configurations (e.g., the lower portions 542 may extend only partially across the end of the cell element, the upper portions 544 may extend all the way across the end of the cell element, etc.)

According to an exemplary embodiment, the current collector 540 is coupled to exposed portions of the edge of the positive electrode 36 by a welding operation (e.g., a laser welding operation) along the lower portions 542 of the current collector 540 (e.g., such as along weld lines 546 as shown in FIG. 20A). According to one exemplary embodiment, the lower portions 542 may contact, bend, or deform the exposed portions of the edge of the electrode 36 prior to welding (e.g., similar to that as shown in FIG. 18B). According to another exemplary embodiment, the exposed portions of the edge of the electrode 36 may be deformed prior to coupling the current collector 540 to the electrode 36. The current collector 540 may then be coupled to the cell housing or a terminal with another welding operation along the upper portions 544 of the current collector 540.

Figure 21:
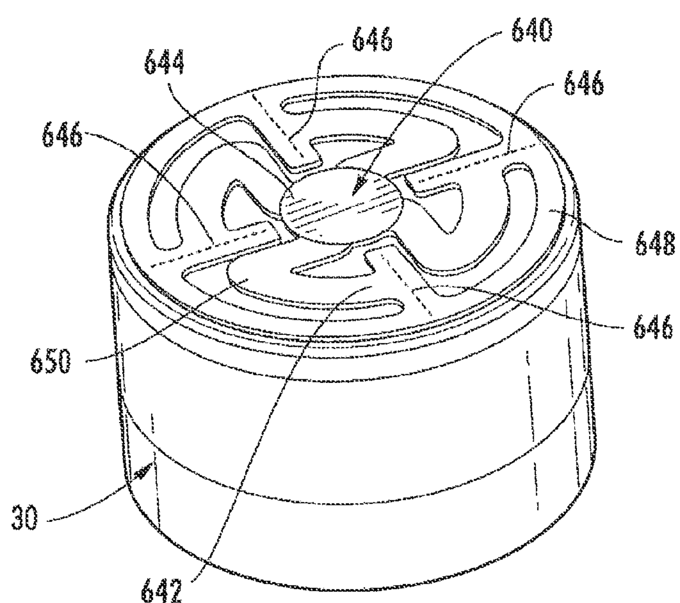
FIG. 21 is a perspective view of a current collector coupled to a cell element according to another exemplary embodiment.

Referring now to FIG. 21, a member or element provided in the form of a current collector or collector plate 640 is shown according to an exemplary embodiment. The current collector 640 may be formed from a stamping process, a laser cutting process, or other suitable process. According to an exemplary embodiment, the current collector 640 may be formed from a material having a thickness of between approximately 1 and 2 millimeters, but may have a greater or lesser thickness according other exemplary embodiments. According to various exemplary embodiments, the current collector 640 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

As shown in FIG. 21, the current collector 640 includes a first or outer member 648 that is connected to a second or inner member 644 by a plurality of members or arms 642. As shown in FIG. 21, the outer member 648 is connected to the inner member 644 by four arms 642. According to other exemplary embodiments, the outer member 648 may be connected to the inner member 644 by a greater or lesser number of arms having the same or different configuration as shown in FIG. 21.

According to the exemplary embodiment shown in FIG. 21, the outer member 648 is provided in the form of a ring or ring-like structure. In the embodiment shown, a perimeter of the outer member 648 substantially matches/aligns with the perimeter of the cell element 30. Also according to the exemplary embodiment shown in FIG. 21, the inner member 644 has a generally circular shape.

According to the exemplary embodiment shown in FIG. 21, each of the plurality of arms 642 includes a first portion connected to the outer member 648 and a second portion connected to a member or extension 650. The extension 650 connects the arm 642 to the inner member 644. As shown in FIG. 21, the first portion of each of the arms 642 extends out from the outer member 648 in a generally perpendicular direction (i.e., the first portion extends generally perpendicular out from the outer member 648). According to an exemplary embodiment, the extension 650 extends out from each of the arms 642 at a point between first and second ends of the arms 642 (e.g., at an approximate midpoint between the first and second ends of the arms 642). According to an exemplary embodiment, the inner member 644 can move relative to the outer member 648 because of the flexibility of the arms 642 and/or the extensions 650.

Figures 24A, 24B, 24C, 24D:
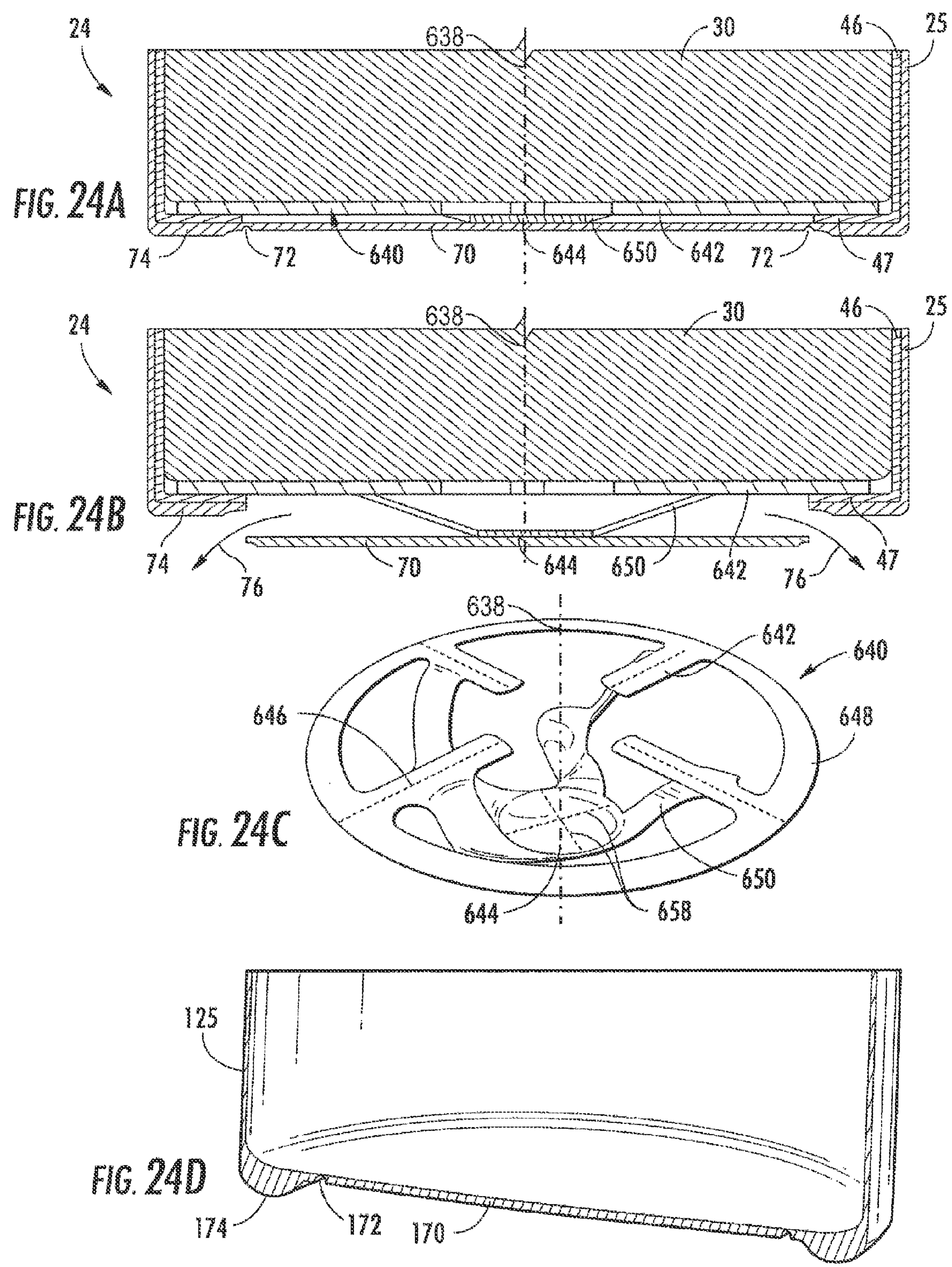
FIG. 24A is a partial cross-sectional view of a cell having a flexible current collector according to an exemplary embodiment.
FIG. 24B is a partial cross-sectional view of the cell having a flexible current collector shown in FIG. 24A after a vent has been deployed according to an exemplary embodiment.
FIG. 24C is a perspective view of the flexible current collector shown in FIG. 24B according to an exemplary embodiment.
FIG. 24D is a perspective view of a housing for the electrochemical cell shown in FIG. 24 according to another exemplary embodiment.

According to an exemplary embodiment, the arms 642 and/or the outer member 648 are coupled (e.g., by laser welding) to and edge of an electrode of the cell element 30 (e.g., such as along weld lines 646 as shown in FIGS. 21 and 24C) and the inner member 644 is coupled (e.g., by laser welding) to a portion of the housing of the cell or a terminal of the cell (e.g., such as along weld lines 658 as shown in FIG. 24C). As shown in FIG. 24C, the weld lines 646 of the arms 642 and the weld lines 658 of the inner member 644 do not align when the vent 70 is deployed. In particular, the lines 642 and 658 are non-parallel (e.g., skewed) as a result of circumferential movement (e.g., twisting) of the arms 642 about an axis 638 of the current collector 640. In other words, when the vent 70 deploys, the arms 642 move in an axial direction along the axis 638 as well as in a circumferential direction about the axis 638. According to an exemplary embodiment, the welding of the arms 642 is performed radially across the edge of the electrode of the cell element 30 (e.g., as shown in FIG. 21). According to another exemplary embodiment, the inner member 644 is coupled to the edge of the electrode of the cell element 30 and the arms 642 and/or the outer member 648 are coupled to the housing or the terminal.

According to an exemplary embodiment, the geometry of the outer member 648, arms 642, extensions 650, and inner member 644 define a plurality of apertures or slots. These apertures or slots allow the current collector 640 to substantially flex (e.g., move, bend, deflect, etc.) if required (e.g., when a vent deploys from the bottom of the housing). For example, as shown in FIG. 24B, the inner member 644 is configured to flex with respect to the outer member 648 when the vent 70 deploys from the end of the cell 24.

Having a flexible current collector allows for increased length of the cell element inside the housing (e.g., to maximize the power capacity of the cell). The flexible current collector also allows the cell element to remain substantially fixed during deployment of a vent. The flexible current collector also helps to isolate the vent from shock and vibration during handling and assembly and during use of the cell.

Figure 22:
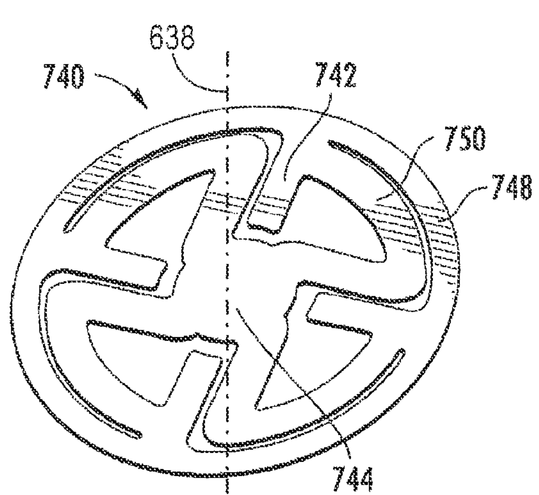
FIGS. 22-23 are perspective views of current collectors according to other exemplary embodiments.

Referring now to FIG. 22, a current collector 740 is shown according to another exemplary embodiment. The current collector 740 is provided with similar but slightly different geometry than that of the current collector 640 shown in FIG. 21. The current collector 740 may be formed from a stamping process, a laser cutting process, or other suitable process. According to an exemplary embodiment, the current collector 740 may be formed from a material having a thickness of between approximately 1 and 2 millimeters, but may have a greater or lesser thickness according other exemplary embodiments. According to various exemplary embodiments, the current collector 740 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

As shown in FIG. 22, the current collector 740 includes a first or outer member 748 that is connected to a second or inner member 744 by a plurality of members or arms 742. As shown in FIG. 22, the outer member 748 is connected to the inner member 744 by four arms 742. According to other exemplary embodiments, the outer member 748 may be connected to the inner member 744 by a greater or lesser number of arms.

According to the exemplary embodiment shown in FIG. 22, the outer member 748 is provided in the form of a ring or ring-like structure. According to an exemplary embodiment, a perimeter of the outer member 748 substantially matches/aligns with a perimeter of the cell element. According to the exemplary embodiment shown in FIG. 22, the inner member 744 has a generally circular shape.

According to the exemplary embodiment shown in FIG. 22, each of the plurality of arms 742 includes a first portion connected to the outer member 748 and a second portion connected to a member or extension 750. The extension 750 connects the arm 742 to the inner member 744. As shown in FIG. 22, the first portion of each of the arms 742 extends out from the outer member 748 in a generally perpendicular direction (i.e., the first portion extends generally perpendicular out from the outer member 748). According to an exemplary embodiment, the extension 750 extends out from each of the arms 742 at a point between first and second ends of the arms 742 (e.g., at a point near the first end of the arms 742). According to an exemplary embodiment, the inner member 744 can move relative to the outer member 748 because of the flexibility of the arms 742 and/or the extensions 750.

According to an exemplary embodiment, the arms 742 and/or the outer member 748 are coupled (e.g., by laser welding) to an edge of an electrode of the cell element and the inner member 744 is coupled (e.g., by laser welding) to a portion of the housing of the cell or a terminal of the cell. According to an exemplary embodiment, the welding of the arms 742 is performed radially across the end of the cell element. According to another exemplary embodiment, the inner member 744 is coupled to the edge of the electrode of the cell element and the arms 742 and/or the outer member 748 are coupled to the housing or the terminal.

According to an exemplary embodiment, the geometry of the outer member 748, arms 742, extensions 750, and inner member 744 define a plurality of apertures or slots. These apertures or slots allow the current collector 740 to substantially flex (e.g., move, bend, deflect, etc.) if required (e.g., when a vent deploys from the bottom of the housing). For example, the inner member 744 is configured to flex with respect to the outer member 748 (or vice-versa). It should be noted that the arms 742 are rotationally symmetric. For example, rotation of the current collector 742 approximately 90 degrees about the axis 638 results in a substantially identical orientation.

Figure 23:
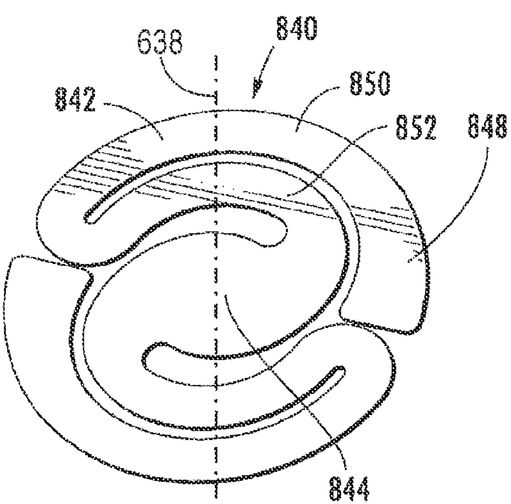

Referring now to FIG. 23, a current collector 840 is shown according to another exemplary embodiment. The current collector 840 may be formed from a stamping process, a laser cutting process, or other suitable process. According to an exemplary embodiment, the current collector 840 may be formed from a material having a thickness of between approximately 1 and 2 millimeters, but may have a greater or lesser thickness according other exemplary embodiments. According to various exemplary embodiments, the current collector 840 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

As shown in FIG. 23, the current collector 840 includes a first or outer member 848 that is connected to a second or inner member 844. As shown in FIG. 23, there are two outer members 848 that are connected to the inner member 844. According to other exemplary embodiments, there may be a greater or lesser number of outer members 848. According to an exemplary embodiment, each of the outer members 848 are connected to a member or element shown as an arm 842 that in turn is connected to the inner member 844. According to the exemplary embodiment shown in FIG. 23, the outer member 848 is provided in the form of an enlarged portion of outer arm 842. The arm 842 has a spiral shape about the inner member 844. That is, the arm 842 emanates from the inner member 844 and has an arcuate shape from the inner member 844 to the outer member 848. As shown, the arm 842 increases in width from the inner member to the outer member 848.

As shown in FIG. 23, each of the arms 842 includes an outer portion 850 and an inner portion 852. According to an exemplary embodiment, an outer portion 850 of the arm 842 substantially matches/aligns with a perimeter of the cell element. As shown in FIG. 23, each of the inner portions 852 of the arms 842 double back along at least a portion of the outer portion 850 of the arms 842 before connecting to the inner member 844.

According to an exemplary embodiment, the outer portion 850 of the arms 842 and/or the outer members 848 are coupled (e.g., by laser welding) to an edge of an electrode of the cell element and the inner member 844 is coupled (e.g., by laser welding) to a portion of the housing of the cell or to a terminal of the cell. According to another exemplary embodiment, the inner member 844 is coupled to the edge of an electrode of the cell element and the outer portion 850 of the arms 842 and/or the outer member 848 are coupled to the housing or the terminal.

According to an exemplary embodiment, the geometry of the outer members 848, arms 842, and inner member 844 define a plurality of apertures or slots. These apertures or slots allow the current collector 840 to substantially flex (e.g., move, bend, deflect, etc.) if required (e.g., when a vent deploys from the bottom of the housing). For example, the inner member 844 is configured to flex with respect to the outer member 848 (or vice-versa). It should be noted that the arms 842 are rotationally symmetric. For example, rotation of the current collector 742 approximately 180 degrees about the axis 638 results in a substantially identical orientation.

Referring now to FIGS. 24A-24D, according to an exemplary embodiment, the cell 24 includes a vent 70. The vent 70 is configured to allow gases and/or effluent to exit the cell 24 once the pressure inside the cell 24 reaches a predetermined amount (e.g., during a rise in cell temperature). When the vent 70 deploys (e.g., activates, opens, separates, etc.), the gases and/or effluent inside the cell 24 exit the cell 24 in order to lower the pressure inside the cell 24 (e.g., as represented by arrows 76 shown in FIG. 24B). According to an exemplary embodiment, the vent 70 acts as a safety device for the cell 24 during a high pressure occurrence.

According to an exemplary embodiment, the vent 70 is located in the bottom or bottom portion of the housing 25. According to other exemplary embodiments, the vent 70 may be located elsewhere (e.g., such as in the lid or cover of the cell). According to another exemplary embodiment, the vent 70 may be located in a cover or bottom that is a separate component from the housing 25 that in turn is coupled to the housing 25 (e.g., by a welding operation).

According to an exemplary embodiment, the bottom of the housing 25 may include a ridge, projection, or ring of material 74 (e.g., as shown in FIGS. 24A and 24B) to prevent fracture of the vent 70 during handling and/or assembly of the cell 24. The ring of material 74 provides for a clearance space between the vent 70 and a surface that the cell 24 is set upon. According to an exemplary embodiment, the clearance space is configured to prevent the vent 70 from being accidentally bumped (and deployed) during handling and/or assembly of the cell 24.

As shown in FIG. 24A, the vent 70 includes at least one annular fracture groove 72 (e.g., ring, trough, pressure point, fracture point, fracture ring, etc.). According to an exemplary embodiment, the annular fracture groove 72 has a V-shaped bottom and is configured to break away (i.e., separate) from the bottom of the housing 25 when the vent 70 deploys. According to other exemplary embodiments, the bottom of the annular fracture groove 72 may have another shape (e.g., rounded shape, curved shape, U-shape, etc.).

As stated earlier, the vent 70 is configured to deploy in the direction along or parallel to the axis 638 once the pressure inside the cell 24 reaches a predetermined amount. When the vent 70 deploys, the annular fracture groove 72 fractures and separates the vent 70 from the rest of the bottom of the housing 25, allowing the internal gases and/or effluent to escape the cell (e.g., as shown in FIG. 24B). By having the vent 70 separate from the bottom of the housing 25, the vent 70 acts as a current interrupt or current disconnect device. This is because the separation of the vent 70 from the bottom of the housing 25 along the axis 638 disrupts the flow of current from the cell element 30 (through the positive current collector 640) to the housing 25. In this way, the vent 70 acts not only as an over-pressure safety device, but also as a current disconnect device. In order to help insulate the cell element 30 and the current collector 640 from the housing 25, the insulative wrap 46 may include an extension 47 provided between the current collector 640 and the bottom of the housing 25.

According to an exemplary embodiment, the vent 70 (e.g., the annular fracture groove 72) is formed by tooling located external the housing 25. The tooling tolerance is only affected by one side of the tool, allowing for a more consistent annular fracture groove 72, resulting in a more consistent and repeatable opening of the vent 70. The depth, shape, and size of the fracture groove 72 may be easily modified simply by changing the tooling. Additionally, the vent 70 is easy to clean and inspect since the vent 70 (and annular fracture groove 72) is located on an external side of the housing 25.

According to one exemplary embodiment, the cell element 30 does not move during deployment of the vent 70 (i.e., the cell element remains stationary). According to such exemplary embodiments, flexible current collectors may be utilized (e.g., such as the current collector 640 shown in FIGS. 21 and 24A-C, the current collector 740 shown in FIG. 22, or the current collector 840 shown in FIG. 23). According to other exemplary embodiments, the cell element 30 may move in order to help deploy the vent 70 (e.g., by "pushing" or "punching" the current collector through the vent). According to such exemplary embodiments, non-flexible current collectors may be utilized (e.g., such as the current collector 340 shown in FIGS. 14-17, the current collector 440 shown in FIG. 19, or the current collector 540 shown in FIG. 20.).

Referring now to FIG. 24D, a housing 125 for an electrochemical cell is shown according to another exemplary embodiment. The housing 125 includes a vent 170 provided in a bottom portion of the housing 125. According to other exemplary embodiments, the vent 170 may be provided elsewhere (e.g., such as in the lid or cover of the cell). According to another exemplary embodiment, the vent 170 may be located in a cover or bottom that is a separate component from the housing 125 that in turn is coupled to the housing 125 (e.g., by a welding operation).

According to an exemplary embodiment, the bottom of the housing 125 may include a ridge, projection, or ring of material 174 to prevent fracture of the vent 170 during handling and/or assembly of the cell. The ring of material 174 provides for a clearance space between the vent 170 and a surface that the cell is set upon. According to an exemplary embodiment, the clearance space is configured to prevent the vent 170 from being accidentally bumped (and deployed) during handling and/or assembly of the cell.

As shown in FIG. 24D, the vent 170 includes at least one annular fracture groove 172 (e.g., ring, trough, pressure point, fracture point, fracture ring, etc.). According to an exemplary embodiment, the annular fracture groove 172 has a V-shaped bottom and is configured to break away (i.e., separate) from the bottom of the housing 125 when the vent 170 deploys. According to other exemplary embodiments, the bottom of the annular fracture groove 172 may have another shape (e.g., rounded shape, curved shape, U-shape, etc.).

Referring now to FIGS. 25-29, a member or element provided in the form of a current collector or collector plate 940 is shown according to an exemplary embodiment. As shown best in FIG. 29, the current collector 940 is used to conductively couple an end of the electrode (e.g., the negative electrode 38) of the cell element 30 to a terminal (e.g., the negative terminal 28).

The current collector 940 may be formed from a stamping process, a laser cutting process, or other suitable process. According to an exemplary embodiment, the current collector 940 may be formed from a material having a thickness of between approximately 1 and 2 millimeters, but may have a greater or lesser thickness according other exemplary embodiments. According to various exemplary embodiments, the current collector 940 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

Figure 26:
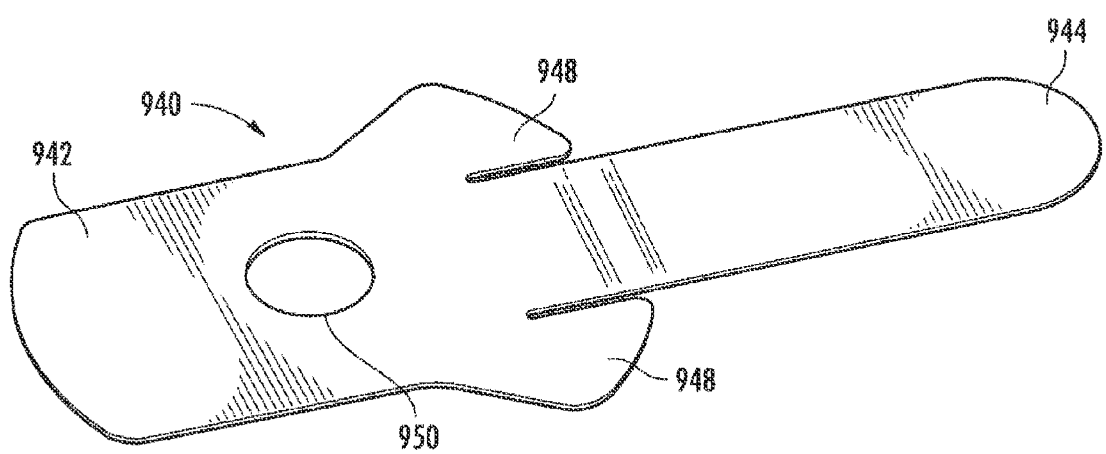
Figure 27:
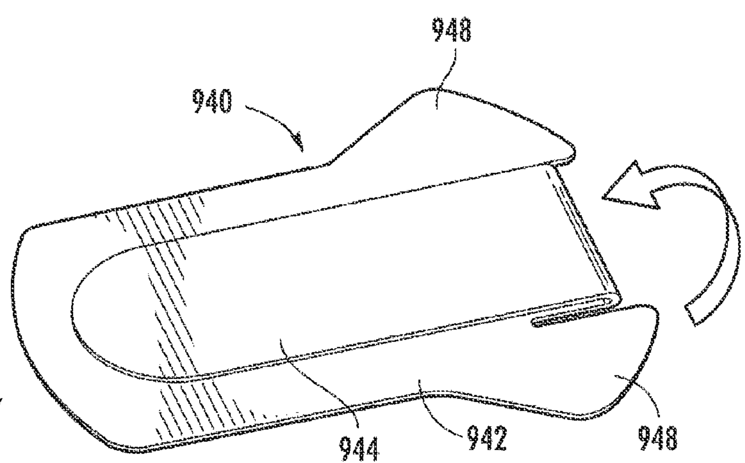

Referring to FIGS. 26-27, the current collector 940 is provided in the form of a generally flat member having a main body 942. Extending out from one end of the main body 942 is at least one tab or extension 944 (shown in FIG. 27 as at least partially folded over the main body 942). According to an exemplary embodiment, the tab 944 is at least partially folded over the main body 942 multiple times (e.g., similar to the tab 44 shown in FIG. 4). According to an exemplary embodiment, the main body 942 includes a hole or aperture 950 (e.g., as shown in FIG. 26). The aperture 950 may be provided as generally aligned with the center of the cell element 30.

According to an exemplary embodiment, the tab 944 is configured to be coupled to a terminal (e.g., the negative terminal) of the cell (e.g., by laser welding). The tab 944 provides a substantially flexible connection between the electrode of the cell element and the terminal and allows the cell element to move relative to the terminal or housing if required.

Figure 25:
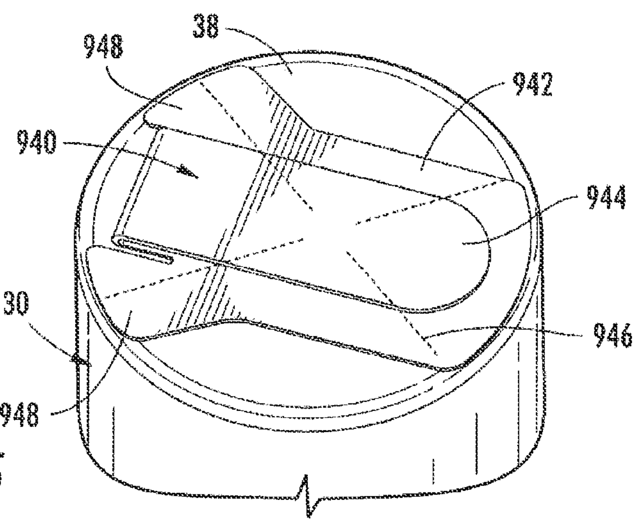
FIGS. 25-27 are various perspective views of a current collector according to another exemplary embodiment.

According to an exemplary embodiment, the current collector 940 also includes a plurality of members or extensions shown as arms 948 that are configured to project or extend out from the main body 942 of the current collector 940. The arms 948, along with the main body 942 of the current collector 940, extend out across one end of the cell element 30 (e.g., to contact the edge of the negative electrode 38 such as shown in FIG. 25). According to another exemplary embodiment, the arms 948 and main body 942 of the current collector 940 may extend only partially across the end of the cell element 30. While two arms 948 are shown in the exemplary embodiment of FIGS. 25-29, according to other exemplary embodiments, the current collector 940 may have a greater or lesser number of arms 948.

As best seen in FIG. 25, the outer edge of the arms 948 may include a rounded or curved shape to complement the perimeter of the cell element 30. According to other exemplary embodiments, the arms 948 (including the ends of the arms) may have other shapes and/or sizes. The current collector 940 may be coupled to the electrode 38 with a welding operation (e.g., a laser welding operation) along the arms 948 and main body 942 of the current collector 940.

According to an exemplary embodiment, radial welds are used (e.g., such as along weld lines 946 as shown in FIG. 25) to couple the current collector 940 to the electrode 38. According to one exemplary embodiment, the radial welds extend from the center of the main body 942 out to the outer edges of the main body 942 and arms 948. According to other exemplary embodiments, the welds (radial or otherwise) may be formed differently. According to an exemplary embodiment, the welding of the current collector 940 to the electrode is done prior to the folding of the tab 944, but may occur at a different time according to other exemplary embodiments.

The use of radial welds (i.e., welds that are radial with respect to the edge of the electrode of the cell element 30) allows for more efficient current flow from the electrode of the cell element 30 to the current collector 940 in that all of the portions of the edge of the wound electrode are coupled (e.g., welded) to the current collector 940 (via the arms 948 and the main body 942). Additionally, radial welds on a wound cell element (such as shown in FIG. 25) allow the weld to occur substantially perpendicular to the edge of the electrode, providing for better weld control and repeatability of the weld from one cell to the next.

While the current collectors of FIGS. 8-13B and 25-29 are generally shown as being coupled to a negative electrode, according to other exemplary embodiments they may be coupled to a positive electrode. Likewise, while the current collectors of FIGS. 14-24C are generally shown as coupled to a positive electrode, according to other exemplary embodiments they may be coupled to a negative electrode. Furthermore, while the current collectors shown in FIGS. 8-29 are configured for use with wound cell elements, according to another exemplary embodiment, the current collectors may also be used with a series of flat plates (e.g., prismatic cells) or other cell configurations.

According to various exemplary embodiments, the current collectors shown in FIGS. 8-29 may be formed from a relatively thin sheet of conductive material (e.g., by a stamping operation, a laser cutting operation, etc.) or may be formed by an extrusion process. According to various exemplary embodiments, the current collectors may be substantially rigid or may include a flexible or pliable portion (such as, e.g., the tabs shown in FIGS. 8-13 and 25-29 or the arms shown in FIGS. 21-23).

Figure 30:
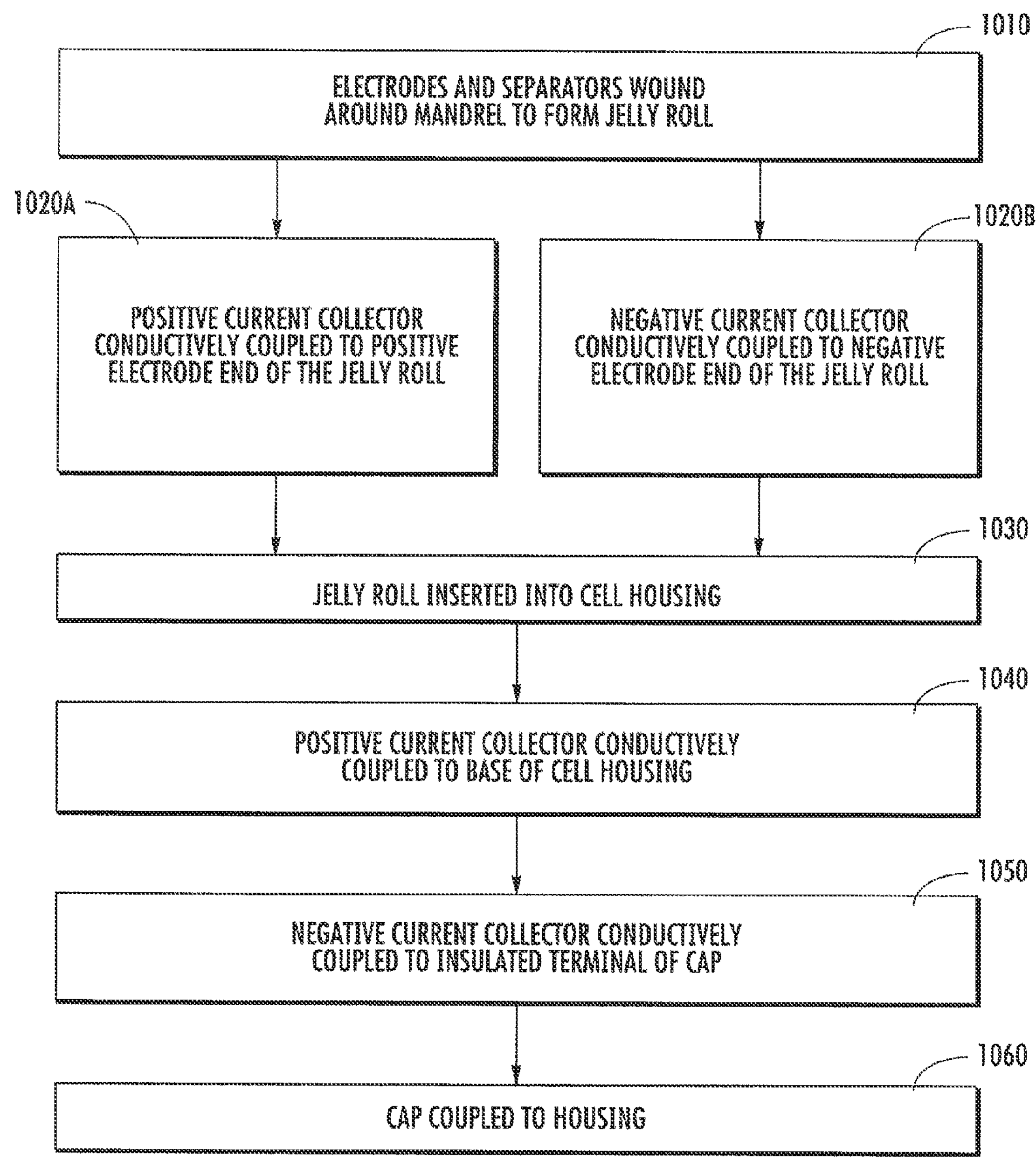
FIG. 30 is a flow diagram of a method of manufacturing an electrochemical cell according to an exemplary embodiment.

Referring now to FIG. 30, an assembly process used to make a battery or electrochemical cell is shown according to an exemplary embodiment. In a first step 1010, the separators and electrodes are wound around the mandrel to form the cell element in a jelly roll configuration. In a second step 1020A/1020B, the positive and negative current collectors are electrically or conductively coupled (e.g., by a welding operation such as laser welding) to the positive and negative electrode ends of the jelly roll, respectively. According to various exemplary embodiments, the step 1020A may occur before, after, or concurrent with the step 1020B.

In a third step 1030, the jelly roll is inserted into the cell housing. In a fourth step 1040, the positive current collector is electrically or conductively coupled (e.g., by a welding operation) to the base of the cell housing. In a fifth step 1050, the negative current collector is electrically or conductively coupled (e.g., by a welding operation) to the insulated terminal of the cap of the cell. In a sixth step 1060, the cap of the cell is coupled to the housing of the cell (e.g., by a welding operation).

According to an exemplary embodiment, a current collector or plate for an electrochemical cell includes a member having a first surface and a second surface opposite the first surface. The second surface comprises at least one projection. The member is configured to be coupled to an electrode of the cell, the electrode having a wound configuration. The at least one projection is configured to engage an offset edge of the electrode so that the member can be welded to the cell.

Another embodiment of the invention relates to a current collector or plate for an electrochemical cell including a member. The member includes a main body and at least two legs extending out from a first end of the body. The legs are configured to engage an offset edge of a wound electrode of the cell so that the member can be welded to the cell.

One embodiment of the invention relates to a substantially flexible current collector for an electrochemical cell. The current collector includes a plurality of members coupled to a cell element and an inner ring coupled to a bottom of a housing.

Another embodiment of the invention relates to a current collector for an electrochemical cell. The current collector includes a main body and at least one arm extending out from a first end of the main body. The main body and the at least one arm are configured to be conductively coupled to a cell element. The current collector also includes a member extending out from the main body, the member being singularly folded partially over the main body. An end of the member is configured to be conductively coupled a terminal of the cell.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the current collectors for an electrochemical cell as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery comprising:

a housing comprising a first end and a second end;

a cell element disposed within the housing;

a vent member coupled to the first end of the housing; and a current collector disposed in the first end of the housing, comprising:

an inner member coupled to the vent member;

an outer member coupled to the cell element; and a plurality of flexible arms extending between the inner member and the outer member and configured to allow the inner member to move relative to the outer member, wherein at least a portion of each arm of the plurality of flexible arms is arcuate from the inner member toward the outer member.

2. The battery of claim 1, wherein each arm has a spiral shape about the inner member.

3. The battery of claim 1, wherein the plurality of flexible arms are rotationally symmetric.

4. The battery of claim 3, wherein the plurality of flexible arms comprise a degree of rotational symmetry in a range of 90 degrees to 180 degrees.

5. The battery of claim 1, wherein the plurality of flexible arms are configured to allow the inner member to move in a direction relative to the outer member, wherein the direction comprises both an axial component along an axis of the current collector and a circumferential component about the axis.

6. The battery of claim 5, wherein a portion of the plurality of flexible arms is welded to the cell element, defining a first weld line, the inner member is welded to the vent member, defining a second weld line, and wherein the first and second weld lines skew when the inner member moves in the direction.

7. The battery of claim 1, wherein the outer member is generally annular and the inner member is generally circular.

8. The battery of claim 1, wherein each arm of the plurality of flexible arms increases in width from the inner member toward the outer member.

9. The battery of claim 8, wherein each arm is continuously arcuate from the inner member toward the outer member.

10. The battery of claim 1, wherein each of the plurality of flexible arms comprises a straight portion coupled to the arcuate portion.

11. The battery of claim 1, wherein the current collector comprises a plurality of open spaces disposed between the plurality of flexible arms and the inner member.

12. The battery of claim 1, wherein the current collector does not have reflective symmetry.

13. The battery of claim 1, wherein the current collector has point symmetry about the inner member.

* * * * *

UNITED STATES PATENT AND TRADEMARK OFFICE

CERTIFICATE OF CORRECTION

PATENT NO. : 8,679,678 B2
APPLICATION NO. : 13/571183
DATED : March 25, 2014
INVENTOR(S) : Fuhr et al.

It is certified that error appears in the above-identified patent and that said Letters Patent is hereby corrected as shown below:

On the Title Page, Item (54) and in the Specification, Column 1, Line 2, replace the word "ELECTROMECHANICAL" with "ELECTROCHEMICAL" in the title of the patent, such that the title correctly reads, "CURRENT COLLECTOR FOR AN ELECTROCHEMICAL CELL."

Signed and Sealed this
Ninth Day of September, 2014

Michelle K. Lee
*Deputy Director of the United States Patent and Trademark Office*